United States Patent
Uzoh et al.

(10) Patent No.: US 7,378,004 B2
(45) Date of Patent: May 27, 2008

(54) PAD DESIGNS AND STRUCTURES FOR A VERSATILE MATERIALS PROCESSING APPARATUS

(75) Inventors: Cyprian Uzoh, Milpitas, CA (US); Bulent Basol, Manhattan Beach, CA (US); Homayoun Talieh, San Jose, CA (US)

(73) Assignee: Novellus Systems, Inc., San Jose, CA (US)

( * ) Notice: Subject to any disclaimer, the term of this patent is extended or adjusted under 35 U.S.C. 154(b) by 969 days.

(21) Appl. No.: 10/152,793

(22) Filed: May 23, 2002

(65) Prior Publication Data

US 2002/0130034 A1 Sep. 19, 2002

Related U.S. Application Data

(62) Division of application No. 09/511,278, filed on Feb. 23, 2000, now Pat. No. 6,413,388.

(51) Int. Cl.
- B24D 11/00 (2006.01)
- C25D 5/22 (2006.01)
- C25F 3/00 (2006.01)
- H01L 21/3063 (2006.01)

(52) U.S. Cl. .................. 204/212; 204/217; 204/224 R; 204/224 M; 204/279; 205/93; 205/662; 451/527

(58) Field of Classification Search ................ 204/279, 204/224 R, 224 M, 217; 451/66; 205/662
See application file for complete search history.

(56) References Cited

U.S. PATENT DOCUMENTS

| | | | | |
|---|---|---|---|---|
| 1,739,657 A | * | 12/1929 | Shemitz | 204/224 R |
| 1,758,682 A | * | 5/1930 | Batenburg et al. | 204/224 R |
| 2,540,602 A | * | 2/1951 | Thomas et al. | 205/321 |
| 3,328,273 A | | 6/1967 | Creutz et al. | 205/298 |
| 3,448,023 A | | 6/1969 | Bell | |
| 3,779,887 A | | 12/1973 | Gildone | |
| 3,959,089 A | | 5/1976 | Watts | |

(Continued)

FOREIGN PATENT DOCUMENTS

DE 2008664 9/1979

(Continued)

OTHER PUBLICATIONS

Chinese Office Action dated Jun. 25, 2004 with English Translation.

(Continued)

*Primary Examiner*—Susy Tsang-Foster
*Assistant Examiner*—William T. Leader
(74) *Attorney, Agent, or Firm*—Knobbe, Martens, Olson & Bear, LLP

(57) ABSTRACT

An apparatus capable of assisting in controlling an electrolyte flow and an electric field distribution used for processing a substrate is provided. It includes a rigid member having a top surface of a predetermined shape and a bottom surface. The rigid member contains a plurality of channels, each forming a passage from the top surface to the bottom surface, and each allowing the electrolyte and electric field flow therethrough. A pad is attached to the rigid member via a fastener. The pad also allows for electrolyte and electric field flow therethrough to the substrate.

36 Claims, 17 Drawing Sheets

U.S. PATENT DOCUMENTS

| | | | |
|---|---|---|---|
| 4,024,029 A | 5/1977 | Rain et al. | |
| 4,110,176 A | 8/1978 | Creutz et al. | |
| 4,140,598 A | 2/1979 | Kimoto et al. | |
| 4,391,684 A | 7/1983 | Goddard | |
| 4,430,173 A | 2/1984 | Boudot et al. | 205/296 |
| 4,466,864 A | 8/1984 | Bacon et al. | |
| 4,610,772 A | 9/1986 | Palnik | |
| 4,948,474 A | 8/1990 | Miljkovic | 205/297 |
| 4,954,142 A | 9/1990 | Carr et al. | 51/297 |
| 4,975,159 A | 12/1990 | Dahms | 205/297 |
| 5,024,735 A | 6/1991 | Kadija | |
| 5,081,421 A * | 1/1992 | Miller et al. | 324/671 |
| 5,084,071 A | 1/1992 | Nenadic et al. | 51/309 |
| 5,171,412 A | 12/1992 | Talieh et al. | |
| 5,256,565 A | 10/1993 | Bernhardt et al. | 437/278 |
| 5,354,490 A | 10/1994 | Yu et al. | 252/79.1 |
| 5,429,733 A | 7/1995 | Ishida | |
| 5,516,412 A | 5/1996 | Andricacos et al. | 252/79.1 |
| 5,543,032 A * | 8/1996 | Datta et al. | 205/670 |
| 5,558,568 A | 9/1996 | Talieh et al. | |
| 5,567,300 A | 10/1996 | Datta et al. | |
| 5,681,215 A | 10/1997 | Sherwood et al. | 451/388 |
| 5,692,947 A | 12/1997 | Talieh et al. | |
| 5,700,366 A | 12/1997 | Steblianko et al. | |
| 5,755,859 A | 5/1998 | Brusic et al. | 106/1.22 |
| 5,762,544 A | 6/1998 | Zuniga et al. | 451/285 |
| 5,769,699 A * | 6/1998 | Yu | 451/528 |
| 5,770,095 A | 6/1998 | Sasaki et al. | 216/38 |
| 5,773,364 A | 6/1998 | Farkas et al. | 438/692 |
| 5,793,272 A | 8/1998 | Burghartz et al. | 336/200 |
| 5,795,215 A | 8/1998 | Guthrie et al. | 451/286 |
| 5,807,165 A | 9/1998 | Uzoh et al. | 451/41 |
| 5,816,900 A | 10/1998 | Nagahara et al. | |
| 5,833,820 A | 11/1998 | Dublin | |
| 5,840,629 A | 11/1998 | Carpio | 438/692 |
| 5,858,813 A | 1/1999 | Scherber et al. | 438/693 |
| 5,862,605 A | 1/1999 | Horie et al. | |
| 5,863,412 A | 1/1999 | Ichinose et al. | |
| 5,884,990 A | 3/1999 | Burghartz et al. | 336/200 |
| 5,897,375 A | 4/1999 | Watts et al. | 438/693 |
| 5,899,792 A * | 5/1999 | Yagi | 451/6 |
| 5,911,619 A * | 6/1999 | Uzoh et al. | 451/5 |
| 5,922,091 A | 7/1999 | Tsai et al. | 204/224 R |
| 5,930,669 A | 7/1999 | Uzoh | 438/627 |
| 5,933,753 A | 8/1999 | Simon et al. | 438/629 |
| 5,954,997 A | 9/1999 | Kaufman et al. | 51/306 |
| 5,985,123 A | 11/1999 | Koon | 205/96 |
| 5,985,679 A * | 11/1999 | Berman | 438/7 |
| 6,004,880 A | 12/1999 | Liu et al. | 438/692 |
| 6,027,631 A | 2/2000 | Broadbent | 205/137 |
| 6,063,506 A | 5/2000 | Andricacos et al. | 428/546 |
| 6,066,030 A * | 5/2000 | Uzoh | 451/41 |
| 6,071,388 A | 6/2000 | Uzoh | |
| 6,074,544 A | 6/2000 | Reid et al. | 205/157 |
| 6,074,546 A | 6/2000 | Sun et al. | |
| 6,103,085 A | 8/2000 | Woo et al. | 205/193 |
| 6,113,462 A * | 9/2000 | Yang | 451/5 |
| 6,132,587 A | 10/2000 | Jorne et al. | 205/123 |
| 6,136,163 A | 10/2000 | Cheung et al. | 204/198 |
| 6,143,155 A | 11/2000 | Adams et al. | |
| 6,176,992 B1 | 1/2001 | Talieh | 205/87 |
| 6,210,554 B1 | 4/2001 | Kosaki et al. | |
| 6,217,426 B1 * | 4/2001 | Tolles et al. | 451/285 |
| 6,251,235 B1 | 6/2001 | Talieh et al. | |
| 6,270,647 B1 * | 8/2001 | Graham et al. | |
| 6,341,998 B1 * | 1/2002 | Zhang | 451/41 |
| 6,346,479 B1 | 2/2002 | Woo et al. | |
| 6,353,623 B1 | 3/2002 | Munks et al. | |
| 6,354,916 B1 | 3/2002 | Uzoh et al. | |
| 6,402,925 B2 | 6/2002 | Talieh | |
| 6,436,267 B1 | 8/2002 | Carl et al. | |
| 6,440,295 B1 | 8/2002 | Wang | |
| 6,471,847 B2 | 10/2002 | Talieh et al. | |
| 6,482,656 B1 | 11/2002 | Lopatin | |
| 6,497,800 B1 | 12/2002 | Talieh et al. | |
| 6,506,103 B1 | 1/2003 | Ohmori et al. | |
| 6,534,116 B2 | 3/2003 | Basol | |
| 6,600,229 B2 | 7/2003 | Mukherjee et al. | |
| 6,610,190 B2 | 8/2003 | Basol et al. | |
| 6,653,226 B1 | 11/2003 | Reid | |
| 6,676,822 B1 | 1/2004 | Talieh | |
| 6,692,338 B1 * | 2/2004 | Kirchner | 451/41 |
| 6,783,446 B1 * | 8/2004 | Suzuki et al. | 451/288 |
| 6,833,063 B2 | 12/2004 | Basol | |
| 6,848,970 B2 | 2/2005 | Manens et al. | |
| 6,867,136 B2 | 3/2005 | Basol et al. | |
| 6,902,659 B2 | 6/2005 | Talieh | |
| 6,936,154 B2 | 8/2005 | Basol et al. | |
| 6,942,780 B2 | 9/2005 | Basol et al. | |
| 6,958,114 B2 | 10/2005 | Talieh et al. | |
| 2002/0004357 A1 * | 1/2002 | Baker et al. | 451/41 |
| 2002/0074238 A1 | 6/2002 | Mayer et al. | |
| 2003/0054729 A1 | 3/2003 | Lee et al. | |
| 2003/0226764 A1 | 12/2003 | Moore et al. | |

FOREIGN PATENT DOCUMENTS

| | | |
|---|---|---|
| DE | 4324330 A1 | 2/1994 |
| EP | 0706857 A1 | 4/1996 |
| JP | 2000208443 A | 7/2000 |
| WO | 98/27585 | 6/1998 |
| WO | WO 00/26443 | 5/2000 |
| WO | WO 01/32362 A1 | 5/2001 |

OTHER PUBLICATIONS

Joseph M. Steigerwald et al., "Chemical Mechanical Planarization of Microelectronic Materials", A Wiley-Interscience Publication, 1997, by John Wiley & Sons, Inc. pp. 212-222, month not available.

Robert D. Mikkola et al., "Investigation of the Roles of the Additive Components for Second Generation Copper Electroplating Chemistries Used for Advanced Interconnect Metalization", 2000 IEEE, IEEE Electron Devices Society, pp. 117-119, Jun. 2000.

James J. Kelly et al., "Leveling and Microstructural Effects of Additives for Copper Electrodeposition", Journal of the Electrochemical Society, 146 (7), 1999, pp. 2540-2545, month not available; Manuscript Rec'd Oct. 1998.

Contolini et al., "Electrochemical Planarization for Multilevel Metallization," Sep. 1994, pp. 2503-2510.

Madore et al., "Blocking Inhibitors in Catholic Leveling," I. Theoretical Analysis, Dec. 1996, pp. 3927-3942.

Reid et al. "Factors influencing damascene feature fill using copper PVD and electroplating," Solid State Technology Jul. 2000, 7 pages.

Rubinstein et al., "Tampongalvanisieren in der Praxis, Teil 1," Galvanotechnik, vol. 79, No. 10, 1998, pp. 3263-3270.

Steigerwald et al., "Pattern Geometry Effects in the Chemical-Mechanical Polishing of Inlaid Copper Structures," Oct. 1994, pp. 2842-2848.

West et al., "Pulse Reverse Copper Electrodeposition in High Aspect Ratio Trenches and Vias," Sep. 1998, pp. 3070-3073.

* cited by examiner

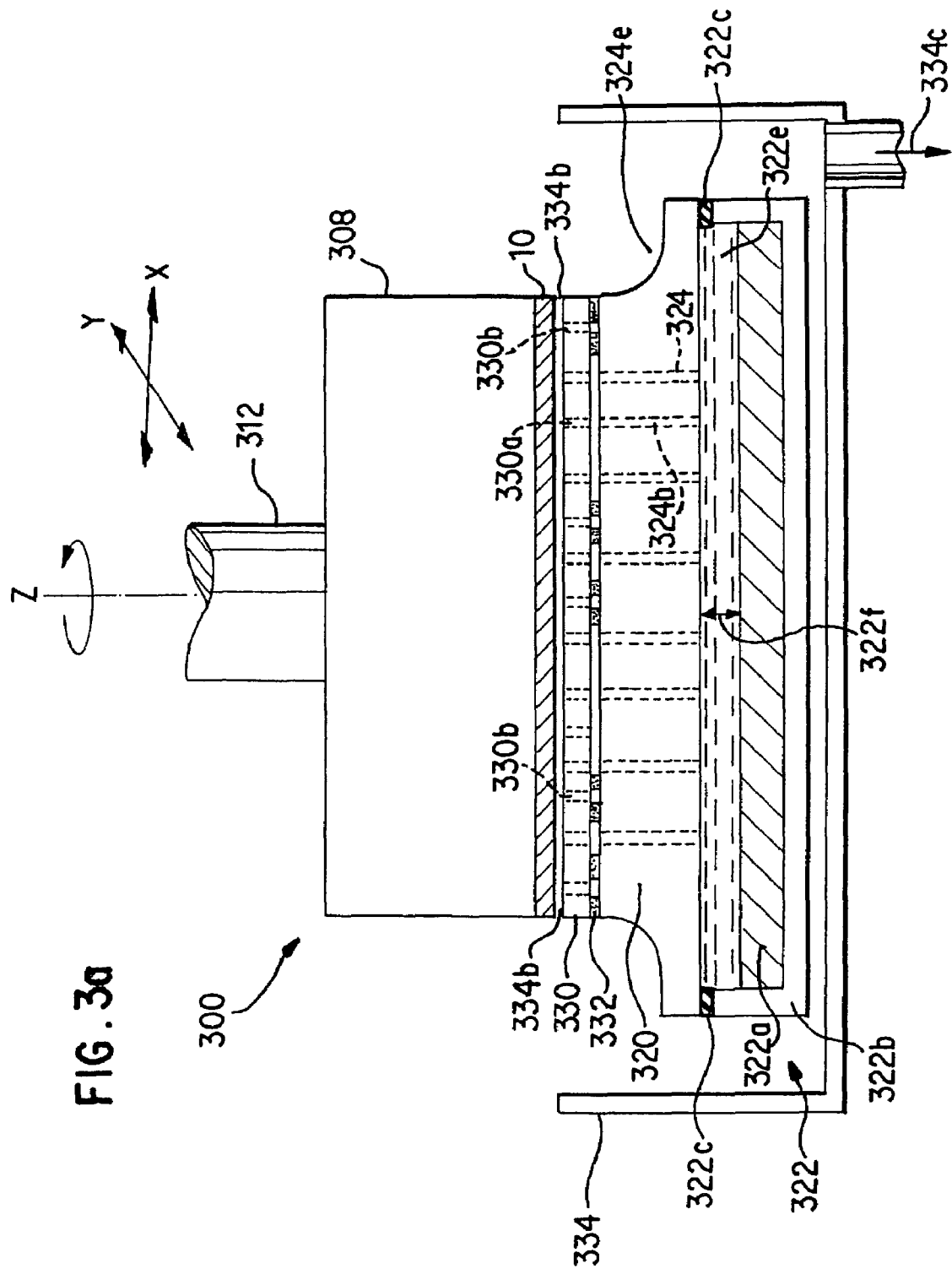

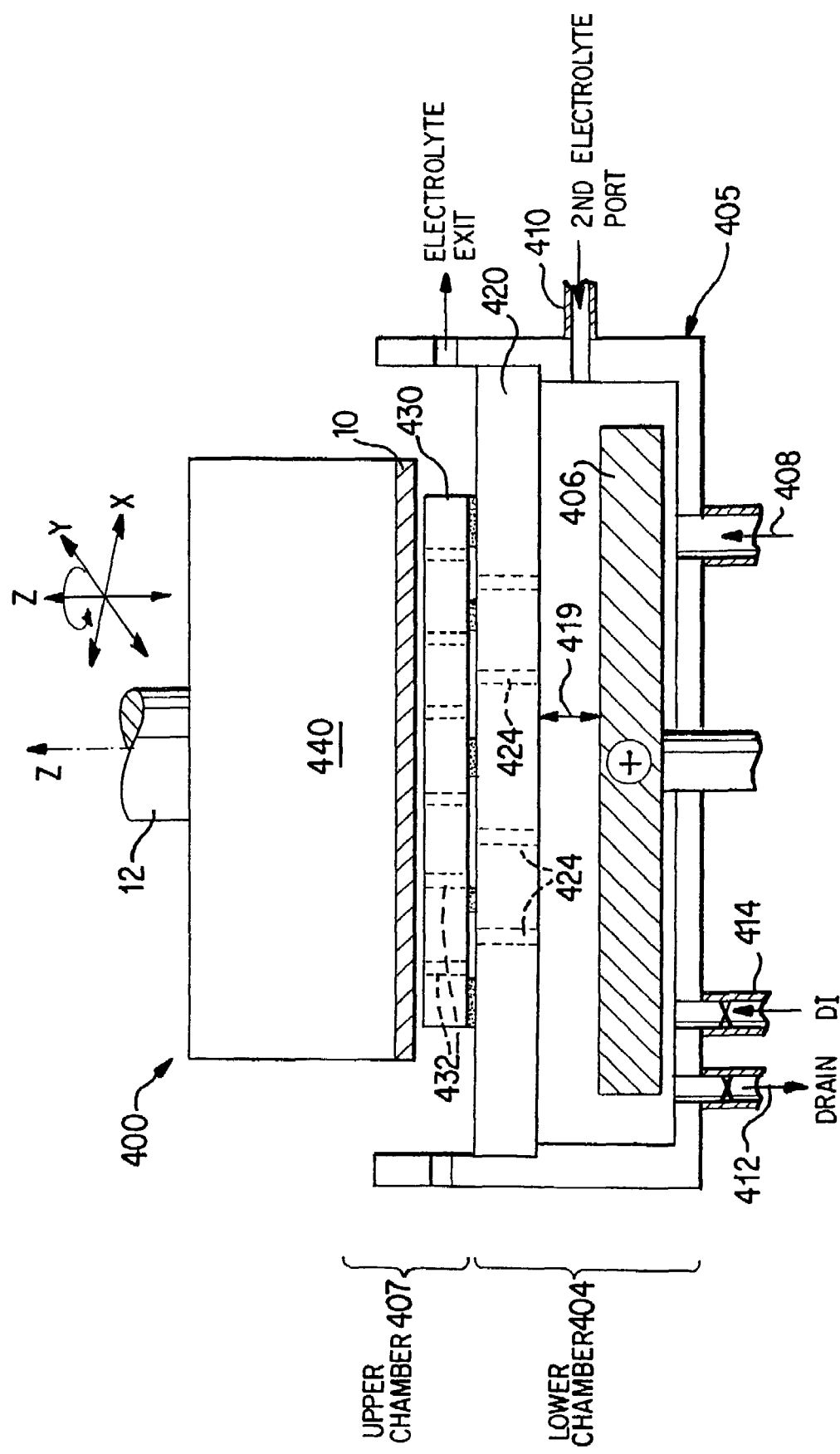

FIG. 5m1
FIG. 5m2
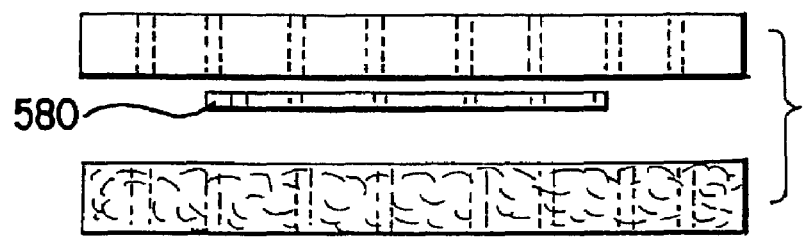
FIG. 5m3
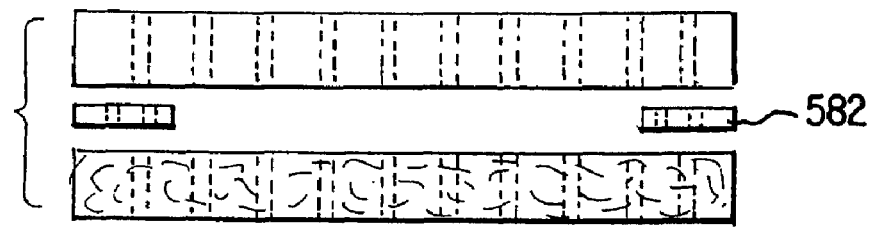
FIG. 5m4

PAD DESIGNS AND STRUCTURES FOR A VERSATILE MATERIALS PROCESSING APPARATUS

This application is a divisional of application Ser. No. 09/511,278, filed Feb. 23, 2000 now U.S. Pat. No. 6,413,388.

BACKGROUND AND SUMMARY OF THE INVENTION

1. Field of the Invention

The present invention relates to a highly versatile apparatus for depositing, removing, modifying, or polishing a material on a workpiece, such as a substrate. More particularly, the present invention is directed to various pad designs and structures for depositing, removing, modifying and/or polishing a material on a suitable substrate.

2. Description of Related Art

There are numerous processing steps in the fabrication of high performance integrated circuits (ICs), packages, magnetic film heads, thin film display units, and the like. One important step is to deposit, remove, or planarize a conductive or insulative material on a workpiece, such as a semiconductor substrate. Deposition of conductive materials such as copper, gold, nickel, rhodium, and their various alloys may be performed, for example, by electrodeposition.

In inlaid metal technology, a workpiece, such as a substrate 10 shown in FIG. 1a, may consist of various topographical features such as channels 14 and vias 12 etched in a suitable dielectric material 16. The surface of the etched dielectric material 16 is generally coated with a suitable adhesion/barrier film layer 18. Over the barrier layer 18, a suitable plating base layer 20, often called a "seed layer", is deposited. A conductive layer 22 is then applied over the plating base layer to fill, and preferably over-fill, the vias 12 and channels 14 etched in the dielectric material 16 as shown in FIG. 1c.

The conductive material may be, for example, Cu deposited by way of a chamber-type device 100 (generally shown in FIG. 1b). The chamber device 100 includes a deposition chamber 102, which contains an anode 104 and electrolyte 106. The anode 104 may be attached to the bottom of the chamber 102.

A holder 108 holds the workpiece, such as the substrate 10. For a detailed description of the holder, reference can be made to the assignee's co-pending application Ser. No. 09/472,523, entitled "Work Piece Carrier Head For Plating and Polishing" filed Dec. 27, 1999, the specification of which is incorporated by reference herein as non-essential matter.

For the deposition process, the substrate 10 is typically immersed in the electrolyte 106 with the aid of the holder 108, which also provides a way of electrically contacting the substrate 10. By applying a potential difference between the anode 104 and the substrate 10 (i.e., the cathode), materials may be deposited on or removed from the substrate. For example, when the anode is more positive than the substrate, copper may be deposited on the substrate 10. If the anode is more negative than the substrate, however, copper may be etched or removed from the substrate. To aid electrolyte agitation and enhance mass transfer, the substrate holder 108 may include a rotatable shaft 112 such that the substrate holder 108 and the substrate 10 can be rotated. The substrate 10 is typically spaced apart from the anode 104 at a distance of at least about 10 mm; this distance may, however, be as great as about 300 mm. The surface of the substrate 10 may contain topographic features, such as the vias 12 and channels 14 illustrated in FIG. 1a. After performing material deposition to fill the various features/cavities using electrolyte containing leveling additives, a variation in the thickness of the deposited conductive material 22 inevitably occurs over the surface of the substrate. This variation in thickness is termed "overburden" and is shown in FIG. 1c with reference to portions 22a and 22b.

After depositing the conductive material 22 on the top surface of the substrate 10, the substrate 10 is typically transferred to a chemical mechanical polishing (CMP) apparatus in order to polish, planarize, or both polish and planarize the same surface. FIG. 2a illustrates one possible version of a conventional CMP apparatus 200 used to polish/planarize the substrate 10 and/or electrically isolate the deposited conductive material within the particular features located thereon. The substrate holder 208, which may be similar to the holder 108 described above, holds and positions the substrate 10 in close proximity to a belt-shaped CMP pad 214. The belt-shaped pad 214 is adapted to rotate in an endless loop fashion about rollers 216. The polishing/planarizing process occurs when the rollers 216 rotate and the pad 214 is moved with a circular motion while making contact with the surface of the substrate 10. A conventional slurry may also be applied to the pad 214 while the substrate 10 is being polished. The substrate surface after polishing is shown in FIG. 2b.

The conventional method for depositing a conductive material produces large variations in material overburden across the substrate as shown in FIG. 1c. The conventional CMP of this large overburden causes defects on the substrate 10 such as dishing 22c and dielectric erosion 16c also shown in FIG. 2b. It also is responsible for low substrate processing throughput, which is a major source of manufacturing yield loss.

SUMMARY OF THE INVENTION

There is therefore a need for an apparatus that can reduce the time needed during the planarization phase of the fabrication process, and that can simplify the planarization phase itself. In other words, a more efficient and effective method and apparatus for depositing a conductive material on a substrate is needed. Various pad designs and structures are disclosed herein that can be used for depositing conductive material with a very uniform material overburden on a surface of a substrate.

It is an object of the present invention to provide a method and apparatus for performing any of depositing, removing, polishing, and/or modifying operations on conductive material, which is to be applied to or has been applied on a substrate.

It is another object of the present invention to provide a method and apparatus for depositing a conductive material with minimum material overburden.

It is still another object of the invention to provide a method and apparatus for depositing a conductive material with a uniform material overburden across the surface of a substrate.

It is a further object of the invention to provide a method and apparatus for depositing material on a substrate in an efficient and cost-effective manner.

It is still a further object of this invention to provide various pad designs and structures for depositing a conductive material on a substrate.

It is yet another object of this invention to provide a method for mounting a pad having channels, holes or grooves for depositing a conductive material on a substrate.

It is a further object of this invention to provide a method and apparatus to mount a pad to be used for depositing a material on a surface.

It is yet another object of the invention to provide a method and pad to control the uniformity of a deposited material on a substrate.

These and other objects of the present invention are obtained by providing a method and apparatus for simultaneously plating and polishing a conductive material on a substrate. The substrate (or cathode in the deposition process) is disposed in close proximity to a rotating member having a pad material attached thereto. The pad is interposed between the substrate (cathode) and the anode. Upon applying an electrical current or potential between the substrate and the anode in the presence of a suitable electrolyte, the conductive material may be removed or deposited on the cathode.

In a preferred embodiment, the conductive material may be selectively deposited in the cavities of topographical features on the substrate surface, while the pad material minimizes or prevents material depositions in regions above the cavities.

The nature, design, fabrication and mounting of the pad material used in this invention advantageously allow for the modification of material removal from, or the deposition of a high quality conductive material on, a substrate surface.

Other objects, advantages and novel features of the present invention will become apparent from the following detailed description of the invention when considered in conjunction with the accompanying drawings.

BRIEF DESCRIPTION OF THE DRAWINGS

FIG. 3a illustrates an apparatus in accordance with a first preferred embodiment of the present invention;

FIG. 3b is an enlarged view of the anode component of the apparatus shown in FIG. 3a;

FIG. 4a illustrates an apparatus in accordance with a second preferred embodiment of the present invention;

FIGS. 5a-5m schematically illustrate preferred embodiments of various plating and polishing pads using PSA adhesives, as well as PSA adhesive arrangements, for attaching a pad to a pad support member of the anode component;

DETAILED DESCRIPTION OF THE PREFERRED EMBODIMENTS

Figure 1A:
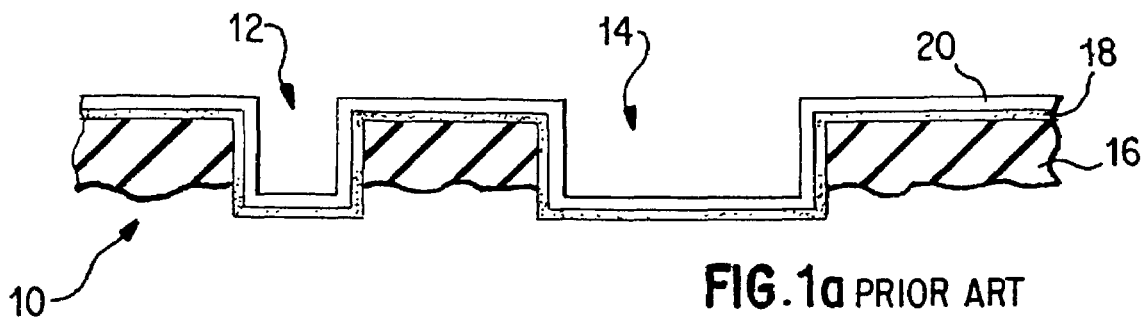
FIG. 1a is a partial cross-sectional view of a substrate having various material layers disposed thereon.

The present invention will now be described in detail. Various refinements in and modifications of the various embodiments are possible based on the principles and teachings herein.

The present invention can be used to deposit and/or remove materials on any substrate, such as a wafer, flat panel, magnetic film head, integrated circuit, package, semiconductor device or chip, or any other device or workpiece of interest. For purposes of this description, the terms "substrate" and "workpiece" can be used interchangeably. Further, the specific parameters referred to herein, such as materials, dimensions, thicknesses, and the like, are intended to be explanatory rather than limiting.

FIG. 3a illustrates an apparatus 300 in accordance with the first preferred embodiment of the present invention. A substrate holder 308 having a rotatable shaft 312 holds and positions the substrate 10 in a manner similar to that described above. The substrate holder 308 can move up, down, and about the z-axis, as well as translate along the x- or y-axes. It has the ability to control the pressure at which the substrate 10 is pushed against a pad 330. However, unlike known processes, both deposition and removal steps are performed using the apparatus illustrated in FIG. 3a, which includes a novel cathode-pad-anode arrangement. For further details on this overall apparatus for performing both deposition and removal steps, reference can be made to assignee's co-pending U.S. application Ser. No. 09/201,929, filed Dec. 1, 1998 and titled "Method and Apparatus for Electrochemical Mechanical Deposition", the specification of which is incorporated by reference herein as non-essential matter.

In FIG. 3a, an anode component, generally indicated at 322, includes a bottom portion 322a, which may be a soluble or inert anode material, attached to an anode holder or housing 322b by known methods. A stiff upper pad support member 320 is attached or secured to the anode holder 322a. Electrically isolating the anode holder 322b from the stiff pad support member 320 is an insulating spacer 322c.

The pad support member 320 is secured to the anode holder 322b with screws in a manner such that they are both electrically isolated from one another. An electrolyte or solution chamber 322e is therefore formed between anode bottom portion 322a and the pad support member 320. The gap 322f separates the anode bottom portion 322a from the pad support member 320. Small channels 324 are formed in the pad support member 320 for fluid solutions to communicate between the chamber 322e to the substrate 10. A polishing pad material 330 is attached above the pad support member 320. The polish pad material 330 may contain two or more distinct types of channels. Channels 330a are provided for the fluids to communicate between the chamber 322e and the substrate 10, and channels 330b for mostly an electric field to communicate between the anode bottom portion 322a, via the electrolyte chamber 322e and pad support member 320, and the substrate 10. The combination of channels (sometimes referred to as holes) are used to manipulate the electrolyte fluid flow and electric field distribution over the substrate 10 to control the nature of the material deposited on the substrate, in particular the uniformity of the deposit on the substrate.

The pad material 330 is secured to the pad support member 320 with the aid of a fastener, such as an adhesive material 332. The entire anode bottom portion-pad support member-pad assembly 322 is housed in another chamber 334, in which electrolytes emanating from interface 334b between the substrate 10 and a surface of the pad material 330 accumulate. This accumulated electrolyte solution may be pumped into a reservoir system for reclaimation and reuse, or may just simply be discarded.

It is further noted that electrical contact with the anode bottom portion 322a may occur directly or via the anode housing 322b, while another electrical contact of opposite polarity is made to the substrate 10. Thus, electrical contact need not be made to the pad support member 320.

By way of example, the anode housing 322b may be formed of polymeric material such as PVDP, polypropylene, PTFE, and/or other materials that are essentially inert to the electrolyte fluids used in the reaction. However, it is most preferred that the anode housing 322b be made of titanium, stainless steel, graphite, and the like. The anode housing may also be coated with a very thin layer of platinum or palladium. The anode material itself may be an inert type of anode such as graphite, platinized metals, such as Pt/Ti and the like. In some inert anode applications, for simplification, the inner wall of the anode housing 322b may serve as the anode.

In other applications, a soluble anode 322a may be housed in the anode housing 322b. The soluble anode 322a may be formed by materials such as Cu, phosphorized Cu, Ni, gold, Pt, Ag, Cd, Rh and/or various other alloy electrode materials depending upon the material to be plated. The insulating sealing spacer 322c may be made of a polymeric material or a combination of polymeric/metallic and/or polymeric/ceramic materials. It is only essential that the electrolyte or fluids used in the reaction do not degrade the spacer 322c, and/or that the spacer 322c does not adversely affect the designed qualities of the metal deposited on the substrate 10. Additionally, the method of securing the pad support member 320 via the insulating spacer 322c must not electrically short the anode 322a to the pad support member 320.

The pad support member 320 is preferably fabricated from a stiff material with a very specific modulus, such as carbon titanium and the like. Stainless steel may also be used. The pad support member material must not interact in an adverse manner with the deposition fluids so as to affect the material deposited on the substrate. The thickness of the pad support member 320 is such that the member behaves as if it has an infinite stiffness relative to itself (weight) and with respect to the applied polishing load. Additionally, the pad support member 320 may be coated with a very thin layer of platinum or palladium, e.g. about up to 500 Å, to enhance the adhesion of the pad material 330 and also to enhance the electric field dispersion.

The anode housing 322b of FIG. 3a has at least one channel for fluid entry (not shown) such that the electrolyte fluid can fill the chamber 322e formed by the gap 322f. The electrolytes then pass through the small channels or holes 324, 324b in the pad support member 320 and through the channels or holes 330a in the pad material 330 to a surface of the substrate 10. The fluid exits the substrate surface as indicated at 334b and returns to the bottom of the outer chamber housing 334, where it is drained via drain opening 334c.

Referring back to the channels or holes formed in the pad material 330, more than one type of channel/hole with respect to the pad support member 320 or the anode 322a may be provided. For example, a first family of channels 330a (or holes, cavities, etc.) can be designed and positioned for fluid and electric field transfer from the electrolyte chamber 322e to the substrate. Hence, the channels 330a may be disposed directly on, or adjacent to, channels 324b formed in the pad support member 320 as shown in FIG. 3a. Another family of holes or channels 330b are positioned with respect to the pad support member 320 (e.g., with the aid of the adhesive sheet 332), such that the electric field predominately communicates from the anode chamber 322e to the substrate 10 through these channels. Other channels may also be designed into the pad material 330 to enhance fluid shearing, mass transfer, and the like, at the substrate surface.

Figure 3B:
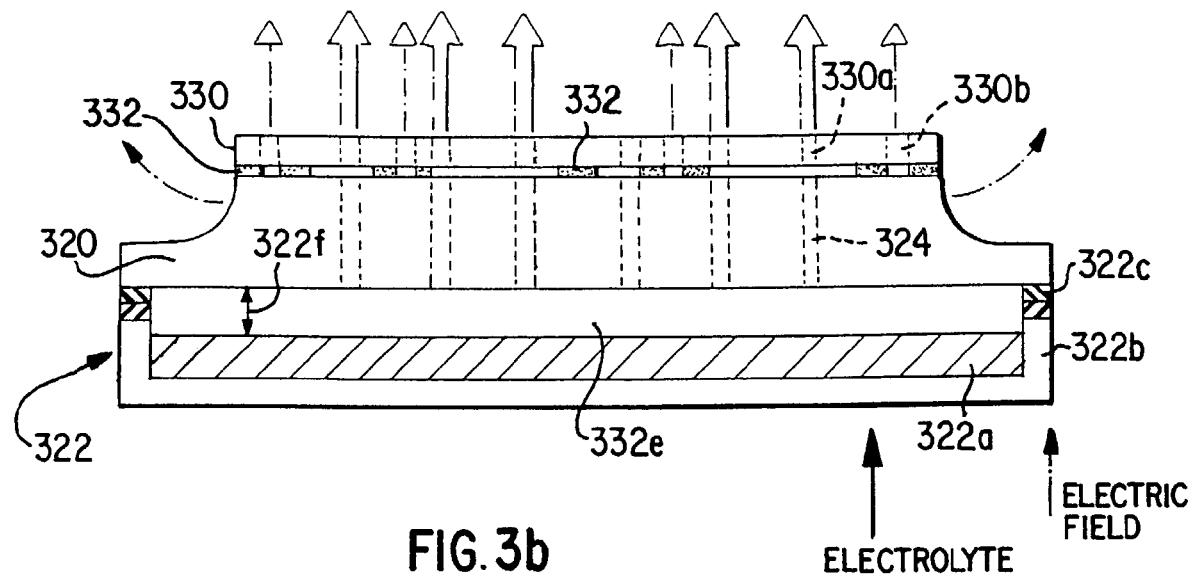

FIG. 3b is an enlarged view of the anode component of FIG. 3a showing a configuration of channels in the pad material 330. Here, the broken arrows indicate channels 330b designed for mostly electric field communication, while the solid arrows indicate channels 330a designed for mostly fluid communication. Thus, as shown by the solid/broken arrows, portions of the channels in the pad material 320 allow both the fluid and the electric field to communicate from the anode chamber 332e to the substrate. Other portions of the pad material predominantly allow the electric field to communicate as opposed to the electrolyte fluid.

Combination of these families of channels 330a, 330b and placement of adhesive sheets 332 are used to control electrolyte and electric field distribution on the substrate 10, and thus control the nature of the material deposited. More particularly, the uniformity of the deposited material can be controlled during plating or plating/polishing operations.

In FIGS. 3a and 3b, the anode-pad support member-pad material is depicted as being stationary. In fact, the combined unit may rotate and also translate in both lateral directions, similar to that of the substrate holder 308.

Referring back to the channels 324 arranged in the pad support member 320 and the channels 330a and 330b in the pad material 330, these channels may have any shape, such as square, rectangular, etc., however, it is preferred that they be cylindrical in shape. The diameter of the channels may range from about 0.01 to 8 mm, preferably between about 0.03 to 6 mm.

The number of channels in the pad support member 320 may range between about 1 to at least 1000, but preferably between about 10 to 800, depending on the dimensions of the pad support member. These channels may be distributed across the lateral dimensions of the pad support member in any profile that enhances fluid and electric field transfer through the channels. For instance, the channels may be spaced apart by about 0.5 to 50 mm, but preferably between about 1 to 20 mm. Also, the channels need not all be uniform, but may have varying dimensions and diameters.

The channels 330*a* and 330*b* in the pad material 330 may be similar to those on the pad support member 320. However, channels 330*b* are positioned in the pad material 330 so as to land on the pad support member away from channels 324, or at least separated from channels 324 via an insulating or adhesive sheet material 332*x* (see FIG. 3*c*). As a result, fluids passing through channels 324 cannot communicate directly with channels 330*b*. In this manner, the electrolytes flowing in channels 330*a* originate directly from channels 324 in the pad support member, while any fluids in channels 330*b* emanate from the fluids discharged from the channels 330*a*. Besides the channels in the pad material, the dimensions of the pad material, e.g. the pad diameter, may also be smaller than that of the substrate.

Another embodiment of the invention is illustrated in FIG. 4*a*. Here, a chamber, generally indicated at 405, includes a lower chamber housing 404 and an upper chamber housing 407. Arranged 411 in or on the lower chamber housing 404 are an anode 406, which may be soluble or insoluble, electrolyte inlets 408 and 410, and drains 412, 414. The anode 406 may be stationary or may rotate. For rotating anodes, a top surface of the anode 406 may include shaped impellers to enhance fluid transfer and communication between the lower chamber and the upper chamber. The lower chamber housing 404 may also contain an anode holder (such as holder 322*b* of FIG. 3*a*) with particulate filtering arrangements.

The entire chamber housing 404, 407 may be made of a polymeric material such as PVDF, or titanium, but preferably from stainless steel coated with a polymeric film such as PVDF, Teflon or other inert materials that do not adversely affect the performance of the electrolyte or deposited material.

The lower chamber is separated from the upper chamber by an electrolyte filled space or gap 419 (when the tool is operational). The electrolyte gap 419 may vary in size from about 0.5 to 30 mm, but preferably between about 1 to 20 mm. This electrolyte gap 419 may serve as a mixing zone for electrolytes before entering the pad support member 420. This is important in the deposition of laminate films, where metals of different composition are deposited. Thus, for example, one type of electrolyte may be injected via electrolyte inlet 408, while a second electrolyte may be injected intermittently or at a different flow rate into the electrolyte gap 419 from the electrolyte inlet 410. For example, one electrolyte may be injected at a flow rate of about 0.2 to 8 L/min through the electrolyte inlet 408, while a second fluid may be injected intermittently or continuously through electrolyte inlet 410 at a rate ranging from about 2 cc to 20000 cc/min. A portion of the electrolyte mixing may occur within the electrolyte gap 419. The balance of the mixing may occur within the pad support member 420, or within the pad material itself and in the area between the pad material 430 and the substrate 10.

Separating the lower chamber from the upper chamber is the pad support member 420 (shown as part of the lower chamber in FIG. 4). The pad support member 420 is essentially a plate with openings or channels 424 allowing the electric field and electrolyte fluid or fluids to communicate between the lower chamber and the upper chamber. The channels 424 in the pad support member 420 can be of any shape. If they are cylindrical, their diameter may range from about 0.5 to 5 mm, and the spacing between the various channel openings may range from about less than 1 to greater than 4 times their diameter, but preferably between about 1 and 4 times. Also, the channels themselves in the pad support member 420 may vary in diameter. The range of variation in diameter preferably need not exceed 3 times that of the smallest channel opening. The pad support member 420 may be fabricated from a polymeric material, but preferably from titanium or stainless steel, a ceramic material, a high performance composite material, or some combination of the above materials. It is preferred than the pad support member 420 be coated with a very thin layer of Pt or palladium. The material preferably should not, however, degrade the performance of the electrolyte, degrade the deposited material on the substrate, or cause the pad material to react with the electrolyte.

Also, the pad support member 420 should be sufficiently stiff to minimize its deformation or deflection during material deposition and planarization pressures. In addition, the mount for the pad support member should be designed to minimize deformation or deflection of the pad support member 420. Thus, stiffeners (not shown) may be used as appropriate, on the lower surface of the pad support member 420 (surface facing the anode 406). It should be noted that the substrate holder 440 of FIG. 4*a* can move in the indicated x, y, and z directions, as well as rotate about the z-axis. The substrate holder 440 has the ability to control the pressure at which the substrate 10 is pushed against the pad 430.

The pad 430 is attached to the top surface of the pad support member 420 which faces the substrate 10. The pad material preferably may contain fixed abrasives. The pad 430 has channels 432 of various shapes and forms. Their distribution on the pad 430 also varies depending on the functions to be carried out. In the present invention, the channels 432 in the pad 430 are designed to influence several important process parameters. These channels 432 determine the distribution of the electrolyte fluid or fluids over the surface of substrate 10. The channels 432 also shape the electric field between the anode 406 and the substrate 10. Proper choice of the pad material and the distribution of channel openings 432 on the pad 430, as well as the channels 424 in the pad support member 420 (or the top anode portion 320 of FIG. 3*b*) allow the inventive apparatus to be used for many different tasks. These include depositing super planar metal layers over a topological surface of the substrate, depositing a material in a conventional way but with better properties, removing material by wet etch or electro-etch, or planarizing an already deposited material.

The pad 430 may be attached to the pad support member 420 of FIG. 4*a* (or the top anode portion 320 of FIG. 3B) by a series of fine screws (not shown) that are recessed well into the pad material. Alternatively, the pad 430 may be attached to the pad support member 420 with a pressure sensitive adhesive (PSA) Regardless of the nature of the pad attachment, the materials used must be inert in the electrolyte and not degrade the electrolyte or the deposited material. As discussed previously, it is preferable that the pad support member 420, which is disposed above the anode 406, be stationary; however, it may also be designed to vibrate or otherwise move with up/down, translational and/or rotational movements. It should also be noted that in FIG. 4a, the pad support member 420 does not form a part of the anode, and is not selectively rendered anodic with respect to the substrate. It's potential may be allowed to float.

Figure 4B:
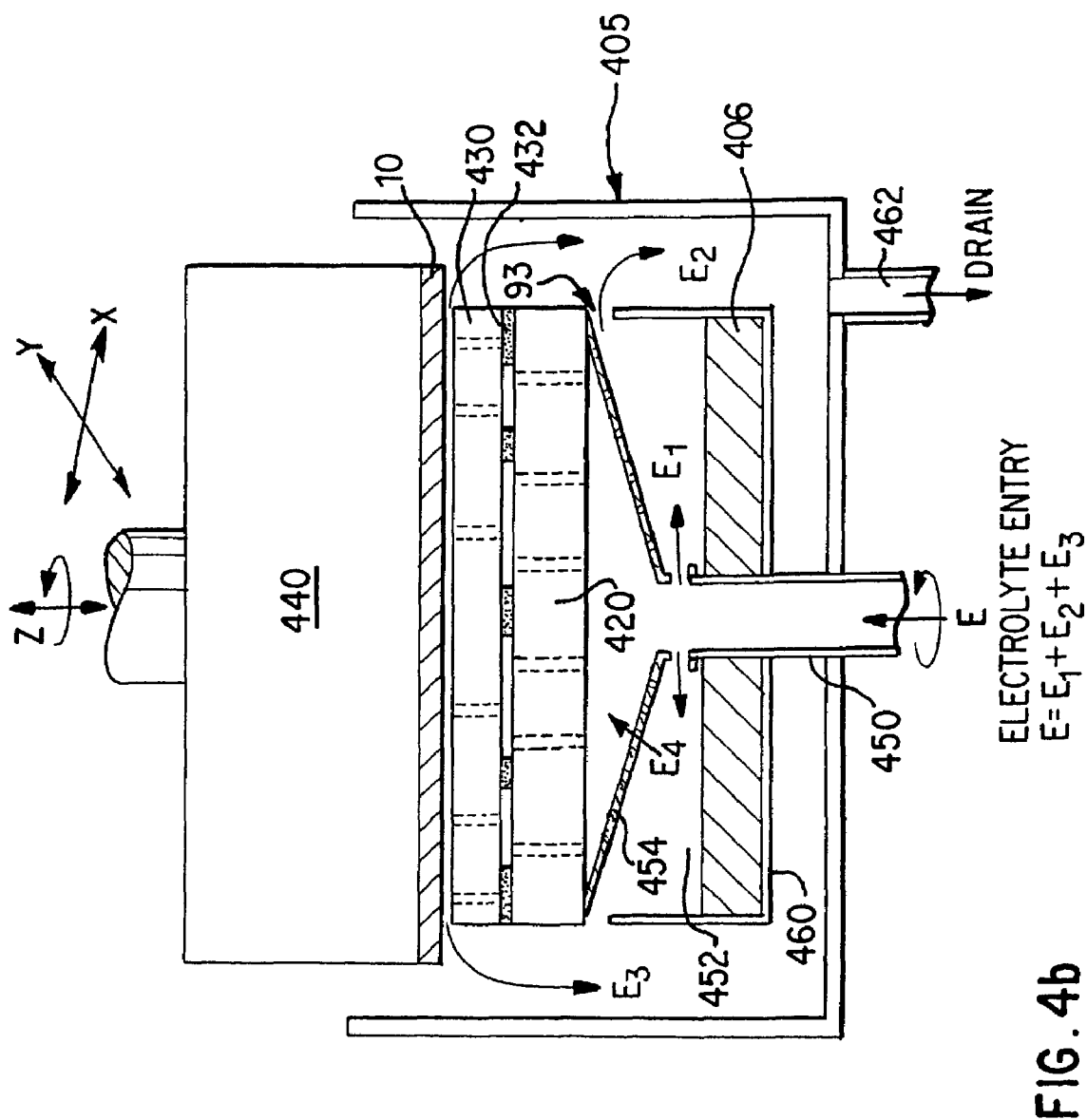
FIG. 4b illustrates an apparatus in accordance with a third preferred embodiment of the present invention.

A third embodiment of the invention illustrated in FIG. 4b likewise includes a substrate holder 440 and substrate 10 as described earlier. The pad material 430 is arranged below the substrate 10 and is secured to the pad support member 420 via adhesive sheets 432. Like the pad material 430, the pad support member 420 also has its own fluid channels as described above. Electrolyte deposition solution E is fed into the pad support member 420 through a shaft 450 or other valving mechanism. Uniquely in this arrangement, the original flow volume of electrolyte E splits its flow into an anode compartment 452 (flow E1) and directly to the substrate. The portion that is fed to the anode compartment 452 (or the anolyte) is further split into two portions. A major portion of this solution flows through a filter 454 (flow E4) to the substrate by passing through the channels of the pad support member 420 and pad 430. The other minor portion E2 of the solution in the anode compartment 452 is allowed to leak out in a controlled manner at the uppermost corners of the anode chamber 452. This controlled fluid leak E2 allows air bubbles to escape and prevents their accumulation over the anode 406. It also allows for the selective loss of anode sludge material in the case of soluble anode materials like CuP, where thick anode sludge may affect metal deposit uniformity. Thus, in this arrangement, the volume of electrolyte E1 at any given time discharged into the anode chamber 452 is such that $$E1=E2+E4,$$

where E2 is the allowed controlled leakage volume to help purge bubbles and anode fines, and the balance E4 is the portion filtered through filter 454 and migrated to the substrate surface via the pad support member channels and pad channels.

In a preferred embodiment, the amount of solution E2 allowed to leak ranges between about 0.1 to 20%, but preferably between about 1 to 10% of the total electrolyte flow E1. Also, it is preferred that the volume E4 of the electrolyte discharged into the anode chamber to minimize concentration polarization ranges between about 10 to 40%, but preferably between about 15 to 30% of the volume flow. Thus, the orifices in the shaft 450 discharging E1 into the anode chamber 452 may be chosen accordingly.

In FIG. 4b, the anode 406 resides or is secured in anode housing 460. A clearance gap 93 separates the anode housing 460 from portions of the pad support chamber adjacent to it. This clearance gap 93 is configured to allow for the controlled electrolyte leak E2 in this region as described earlier. Besides the clearance gap, tiny holes (not shown), typically less than 0.5 mm in diameter, may be drilled around the top of the anode housing 460 to supplement the clearance gap to manage the controlled leak. One or more large ports may also be secured to this region to control the leak solution volume E2.

The electrolyte E3 emanating from the substrate and the controlled leakage solution E2 may drain through a drain opening 462 at the bottom of the anode chamber 405. These solutions are typically drained to a reservoir for process filtering, and then recycled back to the deposition chamber. Also in FIG. 4b, as described earlier, the pad support member 420 may rotate. In this configuration, the anode housing 460 remains stationary. Electrolyte solution injected into the anode chamber 405 from a stationary or rotating pad support member causes excellent agitation of the electrolyte in the anode chamber 405. The rotation of the pad support member 420 may range from about 3 to 400 rpm, but preferably between about 5 to 300 rpm.

Referring again to FIG. 4a, an example involving copper deposition will be described. A suitable copper plating solution is circulated from a reservoir through the lower chamber 404 from electrolyte inlet 408. The anode 406 may rotate to help the expulsion of flow of the electrolyte from the lower chamber 404 to the upper chamber 407 via the channels 424 in the pad support member 422 and the channels 432 in the pad material 430. Electrolyte flow may range between about 50 ml/min to about 12 L/min, but preferably between about 100 ml/min to 6 L/min depending on the size of the substrate 10. The larger the substrate size, the higher the flow rate. As the fluids emanate through and wetten the pad 430, the substrate 10 is lowered to rotate, glide or hydroplane on the surface of the wet pad 430.

The anode and cathode may be energized after a brief moment of wetting the substrate. The current density to the cathode may range between about 1 to 50 mA/cm$^2$, but preferably between about 5 to 45 mA/cm$^2$.

For example, the substrate may be plated at a current density of about 10 to 25 mA/cm$^2$ for 20 to 70% of the deposition time at a pressure of about 0 to 0.5 psi, and at a higher pressure for the 30 to 80% balance of the deposition time. The pressure on the substrate may increase from 0 to 0.5 psi mentioned above to 0.5 to 3 psi. The electrolyte flow may also be varied within the intervals. Also during the deposition, the carrier head may make continuous or intermittent contact with the stationary pad or rotating pad. The substrate and the anode may rotate between about 2 to 250 rpm, but preferably between about 5 to 200 rpm. Also, lateral movement of the substrate relative to the pad may occur during the deposition process. The speed of the lateral motion may range between about 0.5 to 25 mm/second.

The lateral motion is programmed such that the substrate, while rotating, comes to rest momentarily at various points, or during any stage of its motion. In addition, the rotation of the substrate may be varied in such a manner that, for instance, the substrate is rotated at only about 60 to 85% of normal when the substrate is at one end of a smaller anode/pad than when the centers of the substrate and anode coincide.

Figure 1C:
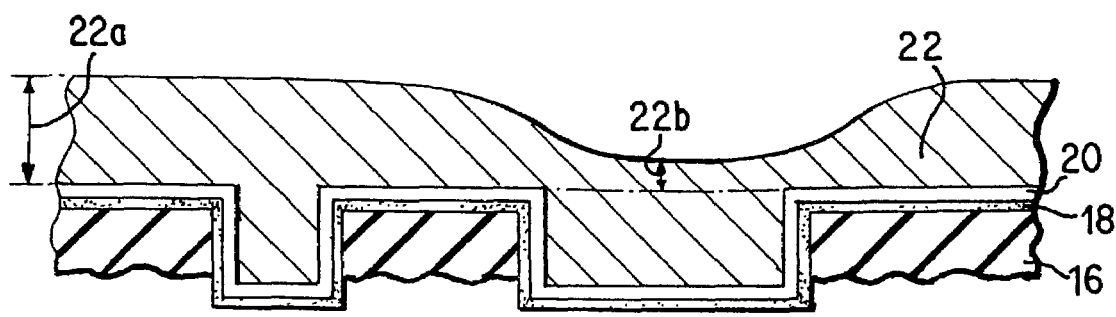
FIG. 1c is a partial cross-sectional view illustrating a variation in material overburden across the substrate after material deposition.

Also, the pressure on the substrate is varied depending on the later position of the substrate relative to the pad. Thus, for a given pad design, the combination of various lateral motions, substrate rotation, substrate pressure and electrolyte flow rate may be used to control the uniformity of the deposited material. The deposited material may be either uniform or thinner at the edge or center of the substrate. Using the above process and an appropriate electrolyte, a superplanar metal deposit may be readily obtained when copper or any other metal is deposited over structures of the type shown in FIG. 1a. A resulting superplanar deposition structure is shown in FIG. 2c, in which the material overburden across the substrate is nearly independent of the width of the features on the substrate. This contrasts with deposited material structures from conventional metal deposition systems as shown in FIG. 1c.

The apparatus of FIGS. 4a and 4b can also be used for etching. Using a shaped pad in which only a small quadrant or rectangular area is accessible to the electrolyte and the electric field, the substrate may be electro-polished or electro-etched in a very controlled manner. The difficulty with electro-etching using a standard pad is that because electric current flows from the substrate's edge towards its center, the material removal rate is higher closer to the electrical contacts. Hence, by making the channel openings arranged closer to the contacts smaller in diameter and fewer in number than those towards the center of the pad, the rate of metal removal by wet etch, electro-etching or polish may be rendered uniform from the center to the edge of the substrate, or may be dynamically controlled.

The invention therefore describes an apparatus allowing for the deposition/removal of material on a substrate or workpiece surface while the surface is in static or dynamic contact with another surface. The other surface need not be the anode. The other surface may be abrasive or non-abrasive in nature. It is essential, however, that the material of the other surface transmit fluid or electrolytes between an anode and a workpiece, as well as allow magnetic, electric or electromagnetic fields to communicate between the anode and the workpiece. In some portions, the pad contact material allows only the electric, magnetic or electromagnetic fields to communicate with the workpiece.

Figure 3C:
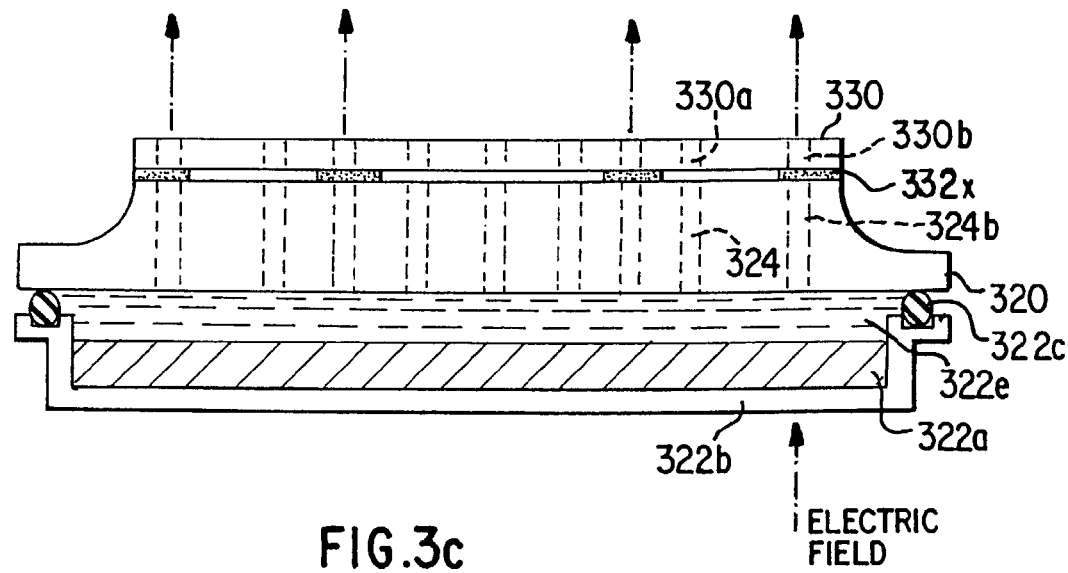
FIG. 3c illustrates another embodiment of the anode component using a non-conducting, non-porous adhesive material.

Besides the choice of the pad material, the design and placement of the adhesive material 332 or 332x (in FIG. 3b and FIG. 3c) between the pad material 330 and the pad support member 320 may be used to control the electrolyte solution flow rate, electrolyte flow pattern, and the distribution of electromagnetic fields or electric fields. As illustrated in FIG. 3c, for example, a continuous circular non-porous and non-conducting adhesive material 332x may be attached to the pad material 330 or pad support member 320 to block some selected flow channels 324b and 330b. The presence of the blocking adhesive layer 332x redistributes the local electric field and electrolyte flow to the adjacent channels 324 and 330a. On the other hand, if the adhesive material is conductive, it selectively blocks the electrolyte flow through the channels 324b and 330b, while permitting the electric field flow. Some channels may therefore be designed to allow both the electrolyte and electric field to communicate between the anode and substrate, while other channels may selectively allow only the electric or magnetic field to communicate. The interplay between the electrolyte and electric/magnetic field flow through these channels controls the material deposition on the substrate, especially the uniformity of the deposit.

In other embodiments, the adhesive material may be a conducting porous material. Also, a conducting adhesive material may be combined with a non-conducting adhesive to attach a pad to the surface of interest. The adhesive material may also be porous or transparent to electric fields, magnetic fields, and even the electrolyte.

In yet other embodiments, the pad material and the adhesive material may selectively diffuse certain ions, e.g. cations while preventing the diffusion of other ions. The criteria for selectivity may be by charge type, charge size, ion size, ratio of ion charge to ion size, and the like.

In yet other embodiments, the pad 330 can be-attached/bonded to the support member 320 using any of the following alternative methods described herein. It is noted that methods other than those described herein can be implemented without departing from the principle teachings provided herein.

FIGS. 5a-5m illustrate views of various plating and polishing pads having PSA adhesives attached thereto in accordance with preferred embodiments of the present invention, as well as PSA adhesives allowing the pad attachment to the top anode portion (or pad support member).

Figure 5A:
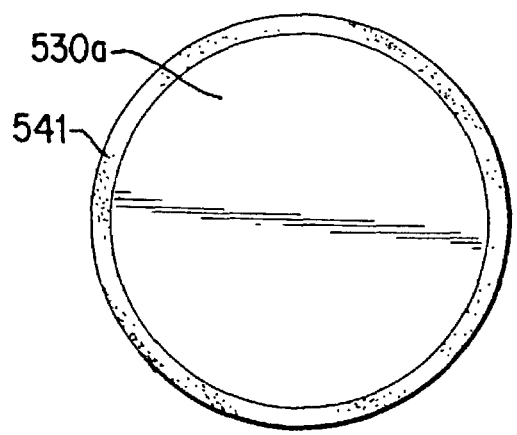

FIG. 5a is a bottom view of a continuous circular adhesive 541 attached/bonded to the bottom of the pad 530a. This prevents the electrolyte solution from leaking from the edge of the anode. Again, the adhesive 541 may be conducting or non-conducting, as well as porous or non-porous as described above. The width (shaded portion) of the circular adhesive 541 is generally between about 2 to 10 mm, depending on the size and shape of the pad 530a.

Figure 5B:
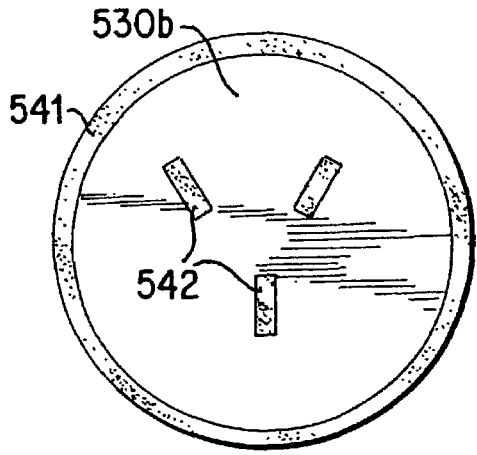

In FIG. 5b, smaller strips of adhesives 542 are provided in addition to the continuous circular adhesive 541 attached to the bottom of the pad 530b as in FIG. 5a. The smaller strips 542 are attached to the bottom of the pad 530b providing additional bonding between the pad 530b and the top anode plate. The smaller adhesive strips 542 have widths that are between about 1 to 5 mm and lengths between about 5 to 50 mm, and may have circular, rectangular, or square shapes. Preferably, the width is between about $\frac{1}{50}$ to $\frac{1}{3}$ the length of the adhesive strips 542. Moreover, although only three adhesive strips 542 are illustrated in FIG. 5b, more or less can be used.

Figure 5C:
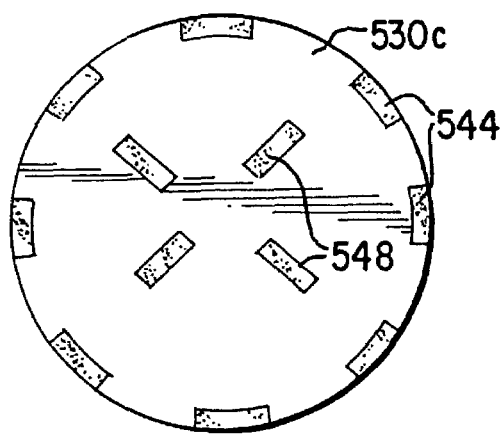

In the embodiment of FIG. 5c, discontinuous adhesive strip portions 544 are arranged about the periphery of the pad 530c. The adhesive strips 544 are spaced apart at regular intervals of, for example, about ¼ to 2 times the length of the strips. Smaller adhesive strips 546 (similar to adhesive strips 542) may be used to provide additional bonding between the pad 530c and the top anode portion. This design can be used to increase the deposited metal thickness at the substrate's edge.

Figure 5D:
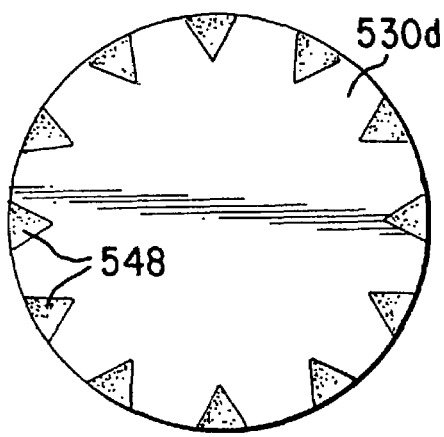
Figure 5E:
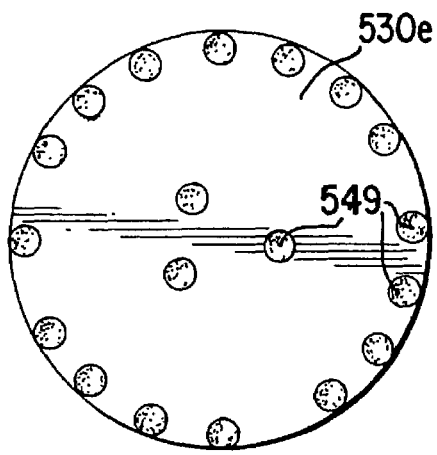

In the embodiment of FIG. 5d, multiple triangular shaped adhesives 548 are attached/bonded to the periphery of the pad 530d. Alternatively, multiple circular shaped adhesives 549 can be attached to the periphery and central areas of the pad 530e as illustrated in FIG. 5e. The circular shaped adhesives 549 can have a diameter between about 0.5 to 8 mm.

Figure 5F:
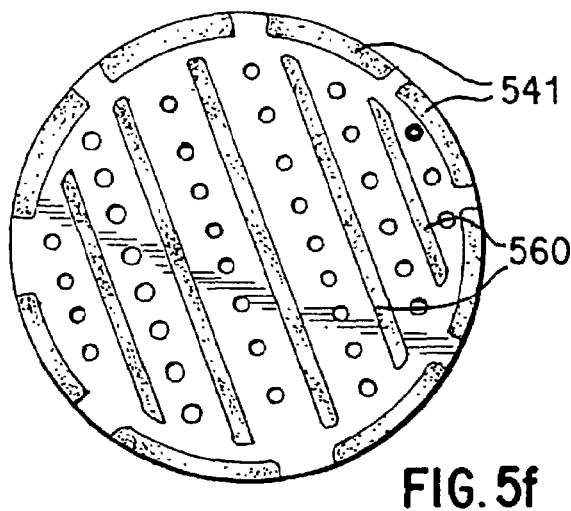

FIG. 5f illustrates another embodiment in which adhesive strips 560 are secured over the anode between the channel openings, in addition to circularly arranged adhesive strips 541.

Figure 5G:
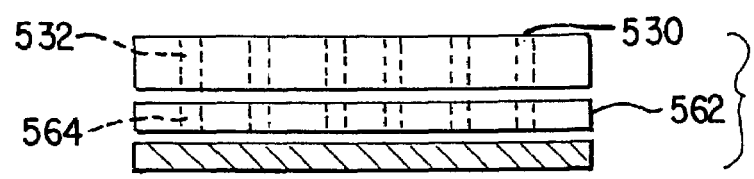

Similar PSA adhesive films are used to attach the pad to either the anode portion or the pad support member. Besides strips, a continuous perforated adhesive material sheet or ply 562 may be used as shown in FIG. 5g. Here, the perforation holes 564 correspond more or less to the channel openings 532 in the pad 530.

Figure 5H:
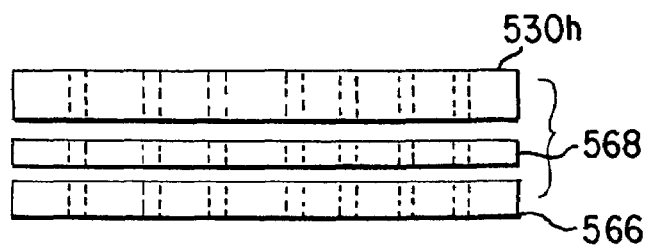
Figure 5I:
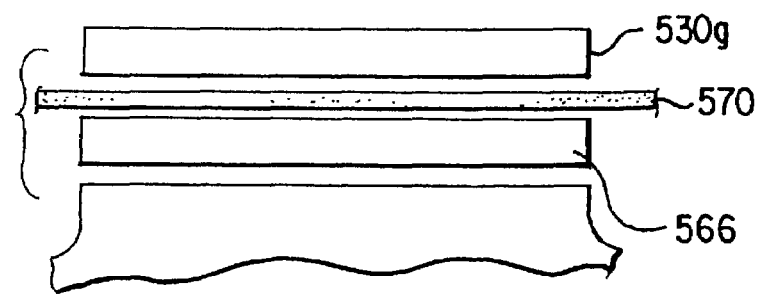
Figure 5J:
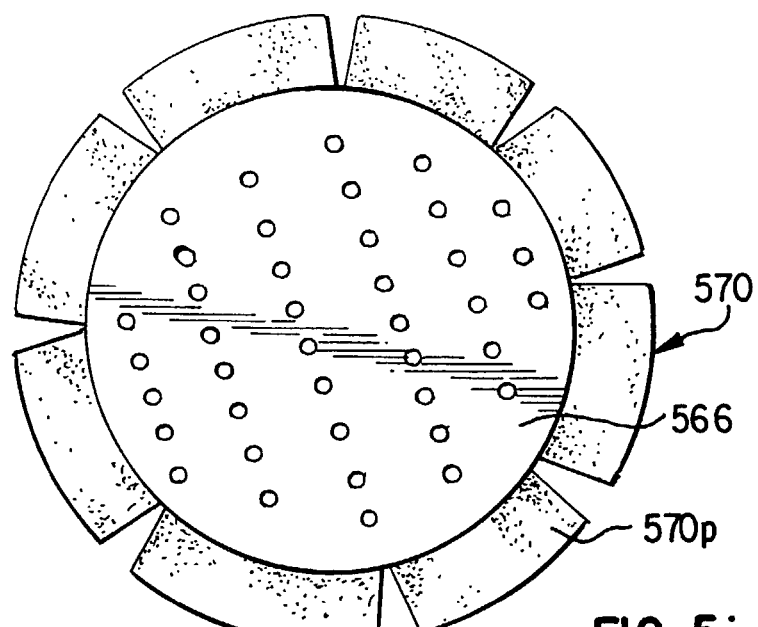
Figure 5K:
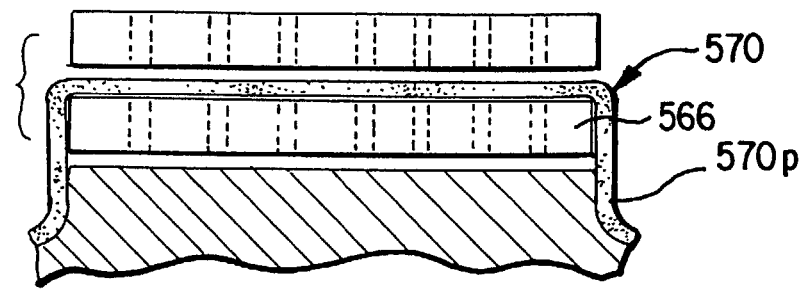

As illustrated in FIG. 5h, multiple pads may be laminated together, such as pad material 530h with subpad material 566, using an adhesive spray or sheet 568. In an alternate embodiment to the adhesive sheet 568 laminating the pad and subpad, FIGS. 5i-5k show an oversized continuous adhesive sheet material 570 used to attach the pad assembly to the anode portion (pad support member). The diameter of the adhesive sheet 570 is larger than that of the sub-pad 566 beneath it. The pad assembly is secured to the anode portion as shown in FIG. 5k using the overlapping portion(s) 570p of the sheet 570.

This presents a very practical method to assemble and secure the pad to an anode surface. The edges of the anode are fully sealed to prevent any undesirable fluid leakage. Thus, all the electrolyte emanates from the top of the pad in a controlled manner.

The channels in the subpad need not align directly with those in the pad material above it. Often, it is advantageous to slightly displace the channels in both pads relative to each other, such that the solution does not spray out of the pad but, rather, oozes or migrates out of the pad.

Figure 5L:
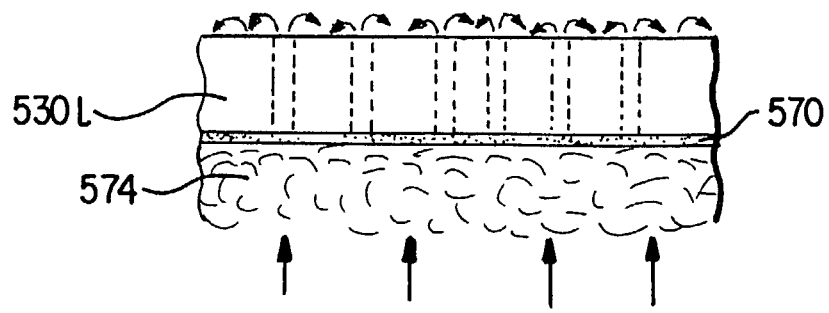

In another embodiment shown in FIG. 5l, the subpad material is a napped polypropylene, polycarbonate or polyurethane type of fabric or material. The use of a fabric material 574 diffuses the flow of electrolyte such that the electrolyte migrates uniformly and evenly from the surface of the pad 530*l*.

The choice of the subpad material should allow the electric field to migrate freely through it with minimum resistance. In this way, the electric field distribution is determined by the channels/holes in the pad only. Also, the subpad material and the pad material may be laminated to form more than two layers to obtain optimum material deposition and removal characteristics.

The entire pad structure or pad assembly may be shaped, such as by varying in thickness from its center to the edge. Thus, the pad assembly may be about 3-25% thicker in regions closer to the center than regions closer to the edge. These lateral variations in pad thickness may be necessary to overcome any substantial difference between material net deposition rates across the surface of the pad.

Figure 2B:
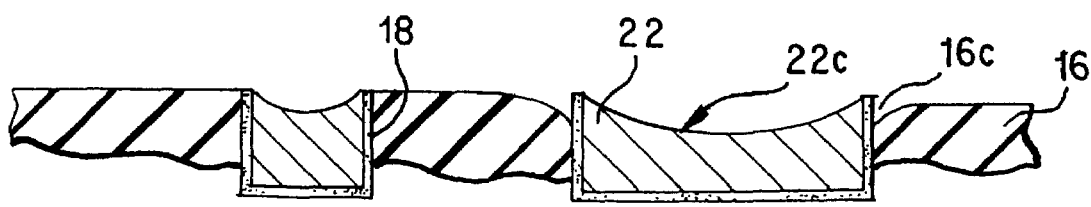
FIG. 2b is-a partial cross-sectional view of a substrate after the conventional CMP process.
Figure 2C:
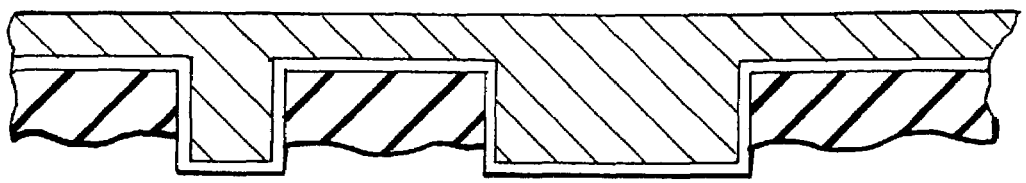
FIG. 2c is a partial cross-sectional view, similar to FIG. 1c, but showing a conductive layer having a uniform overburden across the substrate surface after deposition in a plating and polishing apparatus according to the invention.
Figure 1B:
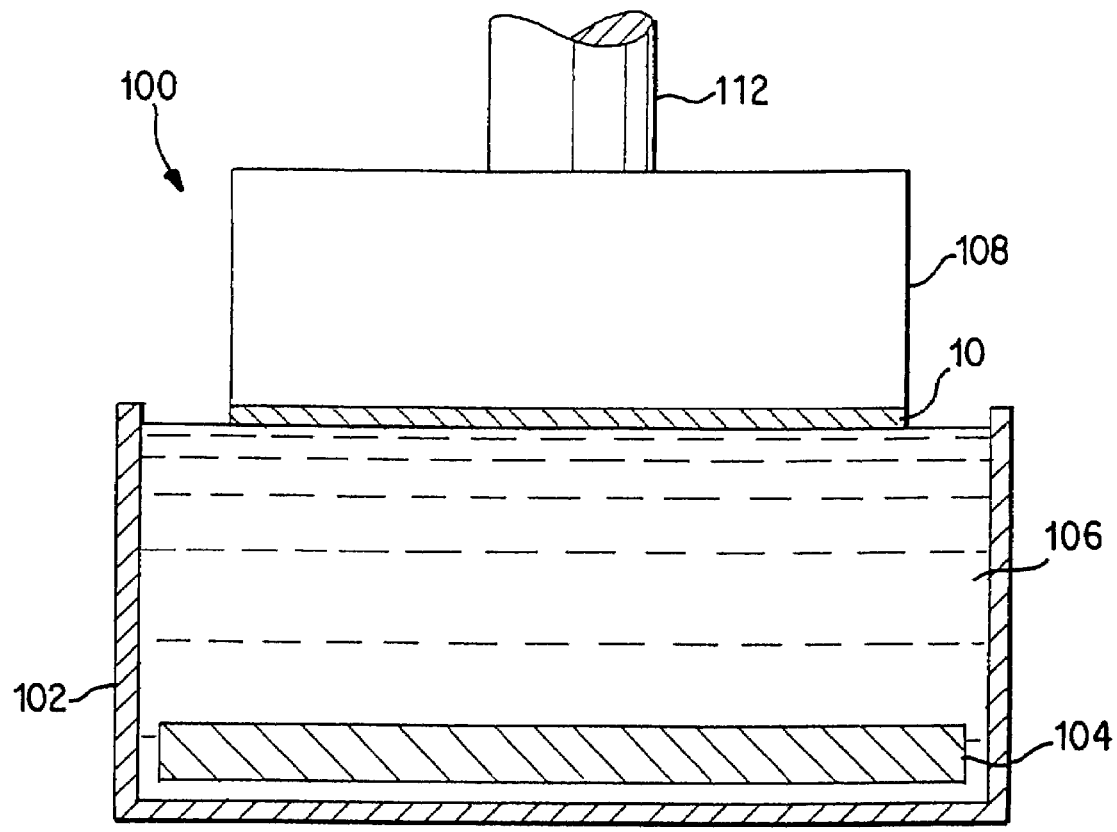
FIG. 1b is a simplified illustration of a conventional deposition chamber for depositing a conductive material on a substrate.
Figure 2A:
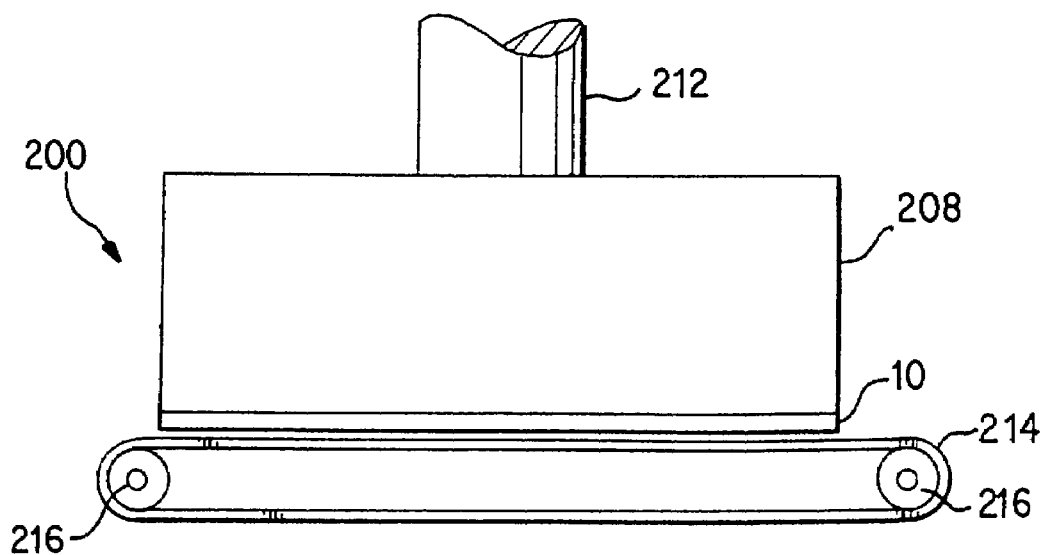
FIG. 2a is a simplified illustration of a conventional CMP apparatus for polishing a substrate surface.

Examples of shaped pads are shown in FIGS. 5*m*1-5*m*4. In FIGS. 5*m*1 and 5*m*2, these shapes are obtained by contouring the pads 530*m*1 and 530*m*2. In FIGS. 5*m*3 and 5*m*4, pads are internally shaped by adding adhesive plys 580 and 582, respectively. For example, a circular PSA type material 580 with its diameter about 20 to 70% smaller than the diameters of the top and sub pads may be inserted therebetween. Multiple layers having similar or different designs may be used to achieve the desired net material deposition uniformity across a substrate. In other applications, the subpad may not be necessary, thus the shaping ply may be bonded directly on top of the anode or pad support member.

Adhesives other than those illustrated herein can be used to attach/bond the pad to the top anode portion (pad support member). These other adhesives may also be shaped in various configurations and in combinations of various shapes described herein so long as they are sufficient to provide a strong bond between the pad and the top anode portion (pad support member), while not degrading the deposited material on the substrate.

As mentioned above, the shape, type, and placement of the adhesives on the pad is important in order to control the uniformity of the deposited material on the substrate. In certain embodiments, a combination of conductive and non-conductive adhesives may be used to obtain a desired level of uniformity. Further, depending on the type, shape, and placement of the adhesives in relation to the pad and the top anode portion or pad support member, the electrolyte solution and electric field distribution across the substrate can also be controlled. For example, when discontinuous sections of adhesives are used, portions of the electrolyte solution may emanate from regions between the adhesives to the pad. Then, the adhesive sheets are used as a fluid or electric field shield or deflector.

Each of the pads described herein may include abrasive or non-abrasive materials. The pad thicknesses may range from about 0.2 to 20 mm, but preferably between about 0.4 to 10 mm. It is also desirable that the pads 330 be made of a material such as polyurethane, kevlar, glass fibers, ceramic fibers, polycarbonate, polyimide, elastomerized epoxy and PVDF, polysulfone or other suitable materials or material combinations.

One of the most important attributes of the pad material is that it does not degrade, contaminate or adversely affect the performance of the electrolyte solution. The pad material may be reinforced with hard abrasive particles. The abrasive particles may be titanium nitride, silicon carbide, cubic boron nitride, alumina, zirconia, diamond, ceria, hard ceramic powders, or hard metallic powders. Again, regardless of the type of abrasive particles used, the abrasive particles should not adversely affect the performance of the electrolyte solution, be dissolved by the electrolyte solution, or degrade the electrical and mechanical properties of the deposited metal layer.

The size of the abrasive particles should be less than approximately 5000 nm, preferably between about 3 to 1000 nm, and most preferably between about 4 to 50 nm. The particle loading or volume fraction in the pad may range from about 5 to 75%, but most preferably range from about 5 to 60% for optimum performance.

The abrasive content of the pad material may be varied radially from the center of the pad to the edge of the pad. For example, particle loading may be about 30-40% in the center and in regions around the center of the pad, and may be gradually reduced to about 5 to 15% at the periphery of the pad material. This gradation in particle distribution within the pad promotes uniform material removal across the pad, such that material removal by the pad is almost independent of the location of the pad. By way of example, for a nominal pad rotating at 100 rpm, the removal rate is expected to be lowest at the center of the rotating polishing pad, while it may be highest close to the periphery of the pad where the pad velocity with respect to the substrate is highest. Similarly, high abrasive loading in the pad material is expected to produced higher material removal rate. Thus, the abrasive loading in a pad may vary so as to effect equivalent removal rates radially across the pad material despite the velocity differences.

Figure 6A:
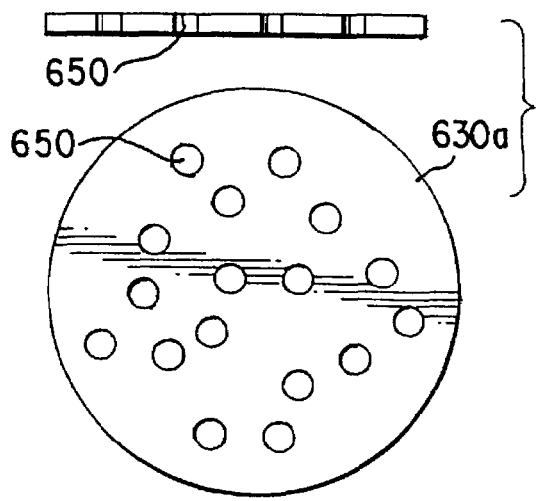
FIGS. 6a-6h each depict top and cross sectional schematic views of the plating and polishing pads having channels, holes, slits and/or grooves in accordance with the preferred embodiments of the present invention.

Each of FIGS. 6*a*-6*h* illustrate top and cross sectional views of plating and polishing pads having one or more of channels, holes, slits and/or grooves in accordance with the preferred embodiments of the present invention. FIG. 6*a* illustrates a pad 630*a* having cylindrical channels 650. The channels 650 extend fully through the pad 630*a* from its top surface to bottom surface as illustrated in the cross sectional view.

Figure 6B:
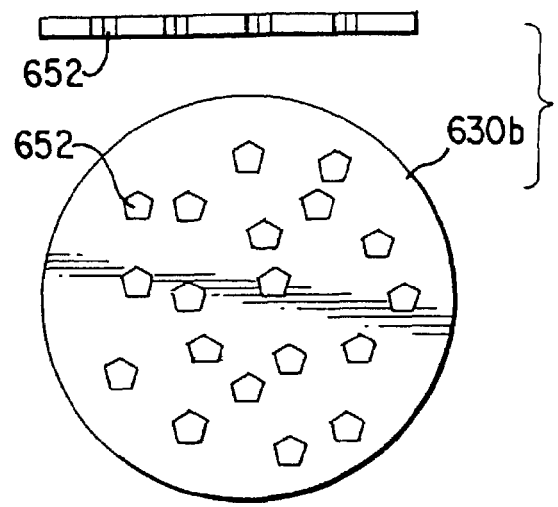

In the embodiment of FIG. 6*b*, the pad 630*b* includes polygonal-shaped channels 652. Here, again, the polygonal channels 652 extend through the pad 630*b* from the top surface to the bottom surface. In certain embodiments, the channel openings 652 cover up to 65% of the pad's surface.

Figure 6C:
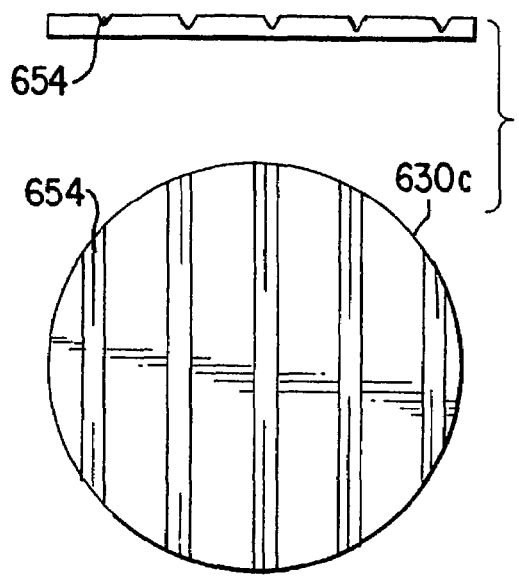
Figure 6D:
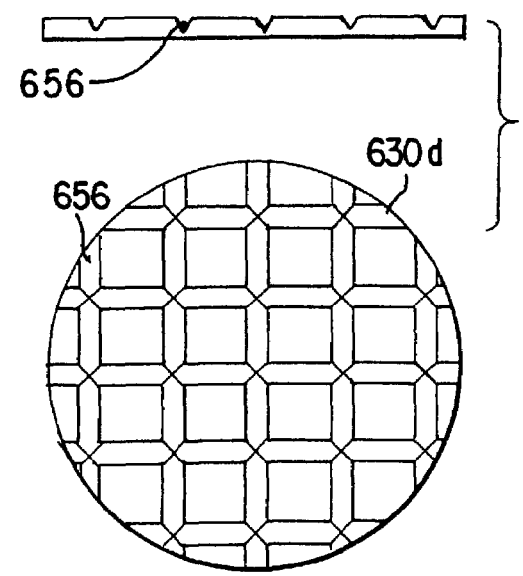

FIG. 6*c* illustrates grooves/slits 654 formed on the top surface of the pad 630*c*. The grooves 654 are shaped to provide a high level of agitation and fluid dynamics on top of the pad near the surface of the substrate, which is difficult to obtain using conventional deposition methods. The groove dimensions can have about 0.5-2 mm depth, and be spaced apart from each other by about 2-15 mm. The grooves can be formed on the pad 630*c* in only one direction as shown in FIG. 6*c*, or grooves 656 can be formed in multiple directions as shown in FIG. 6*d*.

Figure 6E:
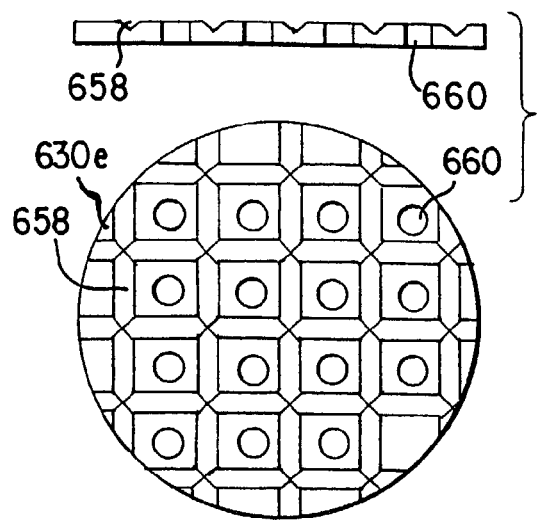
Figure 6F:
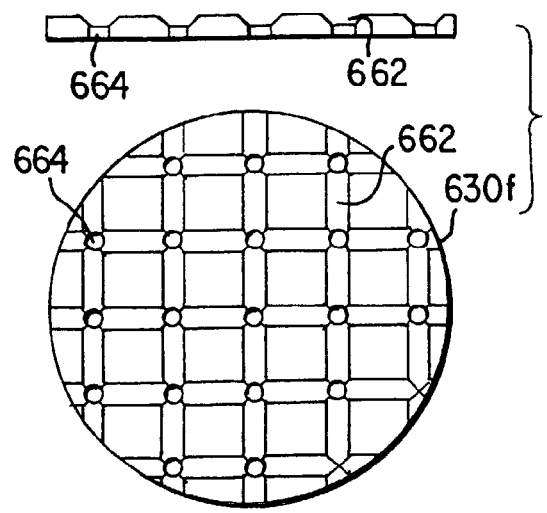

In yet other embodiments, the plating and polishing pad may include both through channels and grooves. For example, FIGS. 6*e* and 6*f* illustrate top and cross sectional views of pads 630*e*, 630*f* having both. In FIG. 6*e*, grooves 658 extend transversely with respect to one another on the top surface of the pad 630*e*. In addition, channels 660 extend through the pad from the top surface to the bottom surface at locations so as not to intersect with the grooves. The channels 660 may have various cross-sectional shapes, such as the circular shape illustrated in FIG. 6*e*, as well as other configurations such as a polygon, rectangle, square, or combinations thereof. In an alternative embodiment shown in FIG. 6*f*, the grooves 662 extend horizontally and vertically, similar to those in FIG. 6*e*, but the channels 664 are arranged to intersect the grooves 662.

Figure 6G:
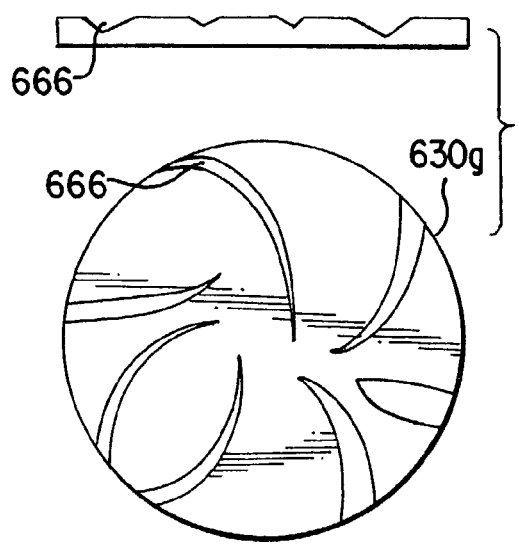
Figure 6H:
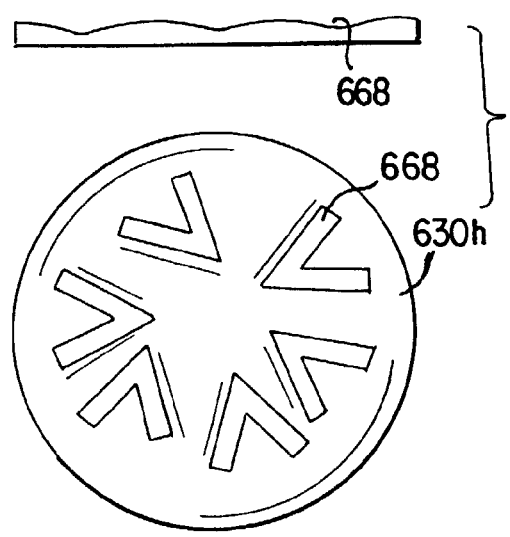

In alternative embodiments, radial V-shaped grooves may be formed on the top surface of the pad. For example, FIG. 6g illustrates multiple substantially radially extending grooves 666 formed on the pad 630g. FIG. 6h illustrates multiple V-shaped grooves formed on the pad 630h. These grooves are shaped to enhance fluid transfer and agitation between the substrate and anode or second surface.

In other instances, the grooves may be wedge-shaped with lips to enhance fluid shear and for continuous injection of the electrolyte solution toward the surface of the substrate. FIGS. 7a-7f are additional cross-sectional views of pads having both channels and grooves/slits in accordance with further preferred embodiments of the invention.

Figure 7A:
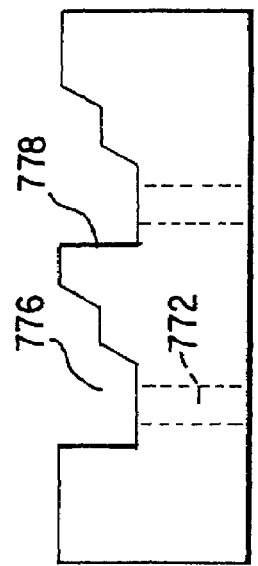
FIGS. 7a-7f illustrate yet additional cross-sectional views of the plating and polishing pads having channels, holes, slits and/or grooves in accordance with the preferred embodiments of the present invention.
Figure 7B:
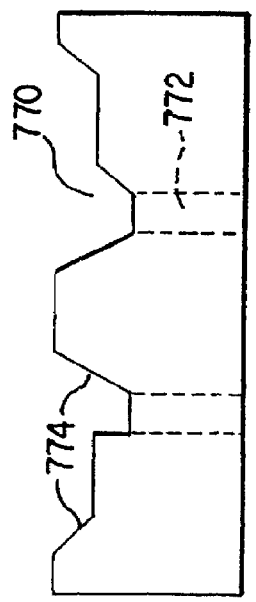

In FIG. 7a, grooves 770 intersect the channels 772 and are shaped such that the electrolyte solution is channeled to the substrate in a manner providing optimal fluid dynamics. The side walls 774 of the grooves 770 are inclined at an angle of between about 0 to 50 degrees with respect to a vertical plane. In other embodiments, such as one shown in FIG. 7b, certain groove side walls 778, 776 may be angled 90 degrees with respect to a horizontal plane.

Figure 7C:
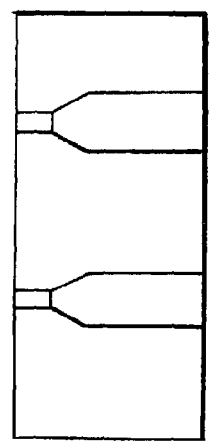
Figure 7D:
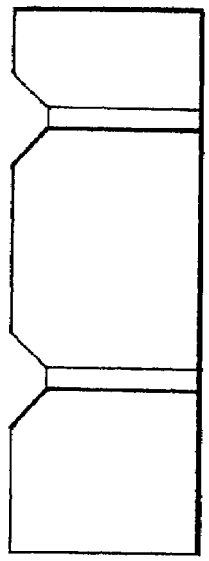
Figure 7E:
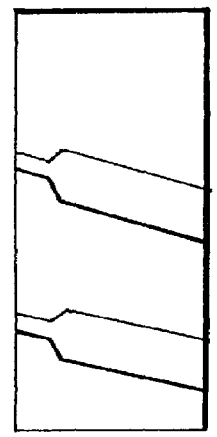
Figure 7F:
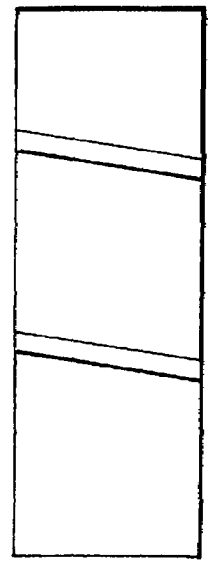

In other embodiments of the present invention, narrow channels and grooves/slits may be used to enhance electrolyte solution flow to the substrate. Examples of various constructions are illustrated in FIGS. 7c-7f. The width of the channels may range from about ⅛ to 3 times the thickness of the pad, and the depth may range from about 4 to 60 times the width of the particular channel. The spacing of the channels may range from about 5 to 50 times their width. The more channels/grooves that are present on the pad, the more vigorously the electrolyte solution is applied to the substrate. Thus, it is important to provide an appropriate number of channels/grooves in the pad such that there is a balance between the deposition and polishing rates. For example, forming channels that are closer than 3 mm apart from each other may lead to premature wear and tear on the pad. The channels need not extend perpendicular to the plane of the pad as shown in FIGS. 7c and 7d. The channels can be inclined relative to a vertical plane at an angle from about 0 to 85 degrees, but preferably from about 15 to 80 degrees, as shown in FIGS. 7e and 7f.

Figure 8:
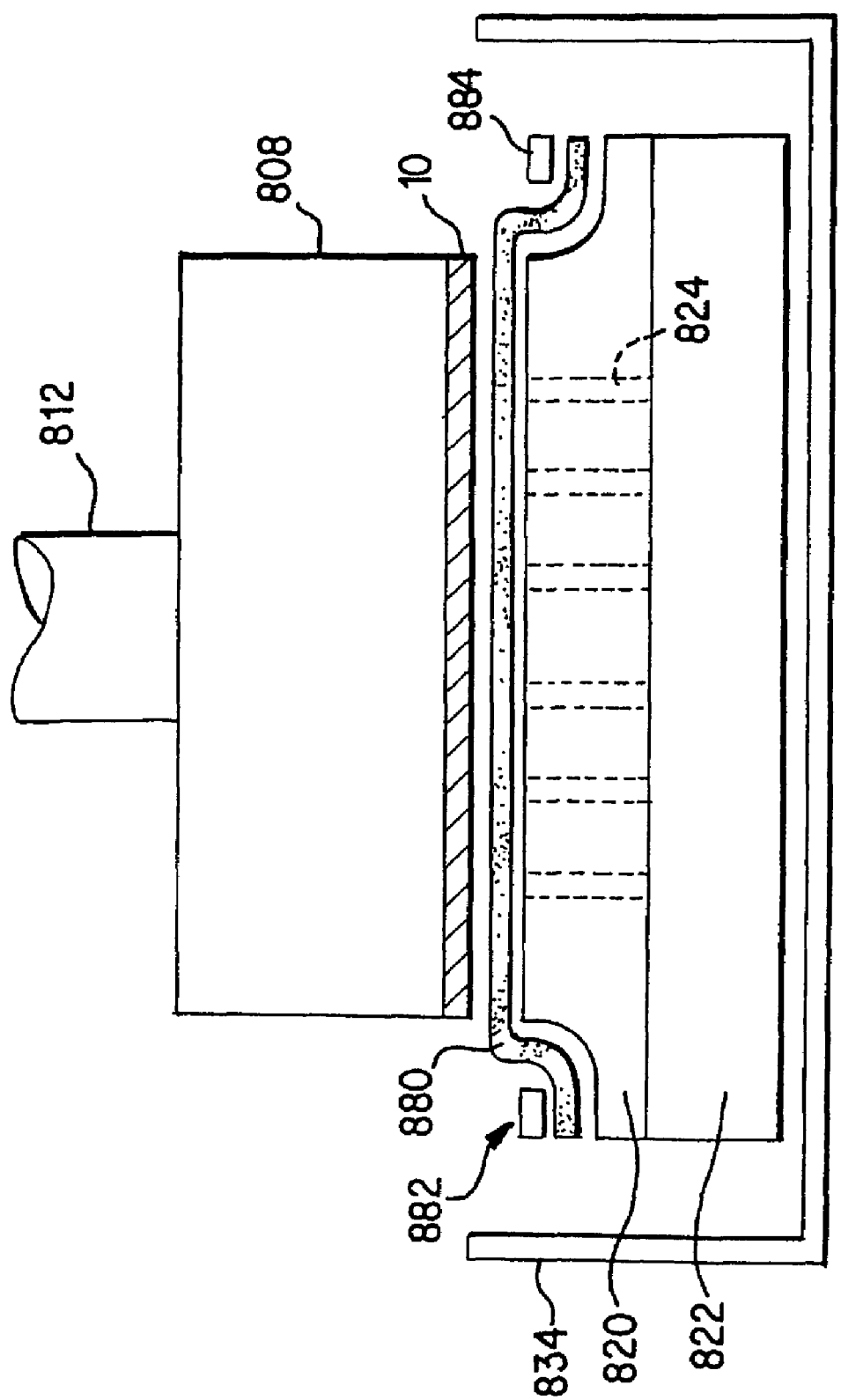
FIG. 8 illustrates an apparatus in accordance with a fourth preferred embodiment of the present invention.

A third embodiment of the apparatus according to the invention is shown in FIG. 8. Here, the plating and polishing pad 880 is shaped so as to be attached to the top anode portion (pad support member) 820 at its flanges 882 via a suitable arrangement such as a ring 884. In this case, adhesive sheets may still be used to attach the pad 880 to the pad support member 820. However, adhesive and non-adhesive sheets may still be used to shape and control electrolyte flow and electric field distribution.

Figure 9A:
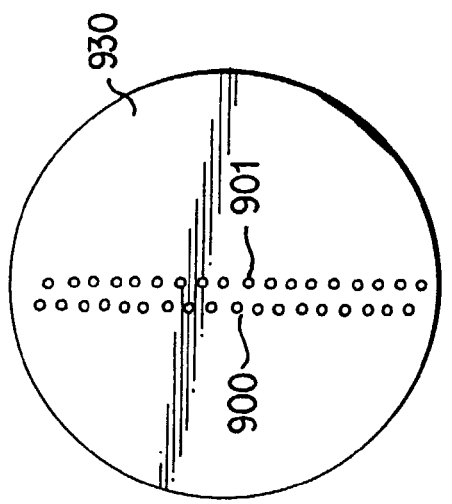
FIGS. 9a-9f are top views of additional preferred embodiments of the plating and polishing pads according to the present invention.
Figure 9B:
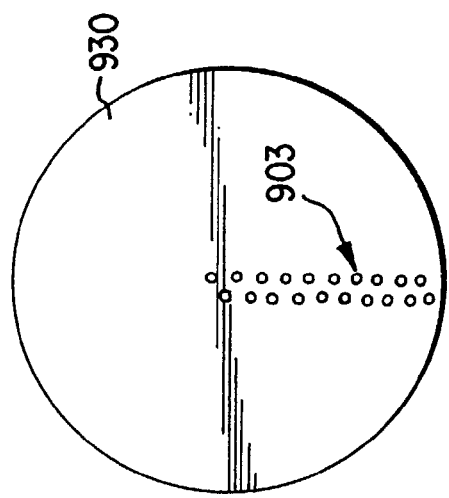
Figure 9C:
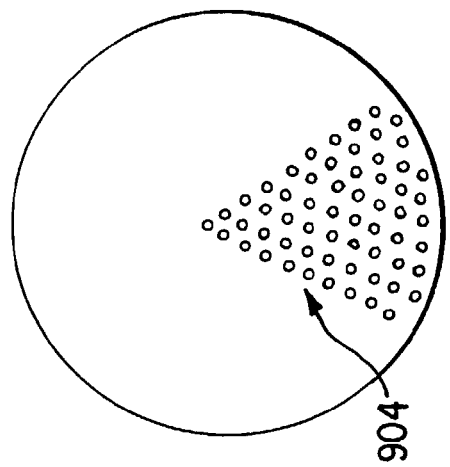

As discussed earlier, the apparatus using a shaped pad can perform electro-etching or workpiece surface modification. In this case, channels/holes/openings/slits or the like may be placed on the pad in substantially linear and non-linear fashion as shown in FIGS. 9a through 9f. FIG. 9a depicts two linear arrays of holes 900, 901 punched in a pad material 930. Both single or multiple arrays may be used. Moreover, for multiple linear arrays, it is beneficial if the holes are slightly staggered with respect to each other. In FIG. 9b, the array of holes 903 originates around the center of the pad and extends only in one radial direction as opposed to diametrically across the pad, while in FIG. 9c, a pie shaped geometric segmental array 904 of holes in disclosed.

Figure 9D:
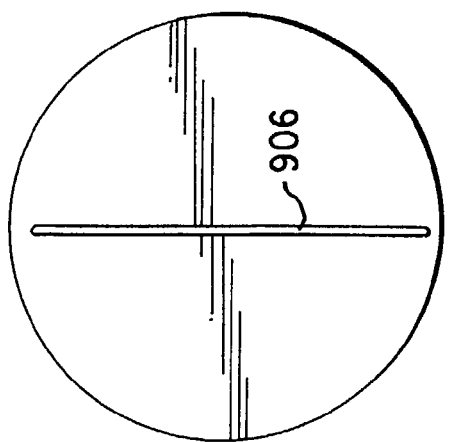
Figure 9E:
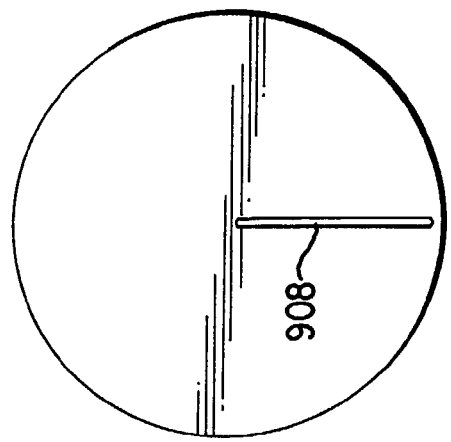
Figure 9F:
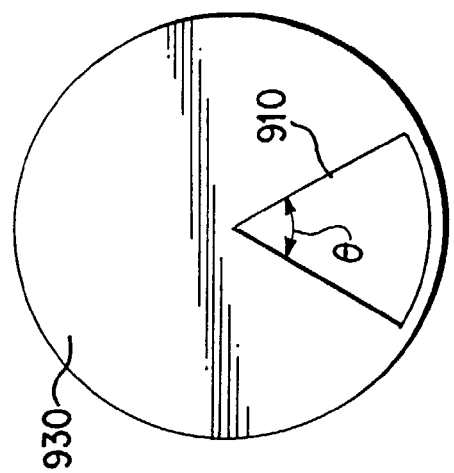

Other embodiments preferably use a slit fabricated into a pad such as by punching or cutting, as illustrated in FIGS. 9d to 9f. In FIG. 9d, a single slit 906 is shown, however, multiple slits may also be used. The slits may be segmented, forming a discontinuous array of slits. In addition to a radial slit 908 depicted in FIG. 9e, a segmental radial slit 910 may also be fabricated into a pad 930 for electro-etching or surface modification applications. Here, the angle θ between the chord of the slit may range from about 0 to 250 degrees, but most preferably range from about 0 to 180 degrees.

During electro-etching applications, the substrate is at a more positive potential than the anode. It is essential that the electrolyte and the electric field communicate to the substrate through the channels/holes/openings/slits, etc. in the pad material. During the etching removal process, either the anode carrying the pad or the substrate may be stationary, while the other component, disposed in close proximity, may rotate. The rotation of the substrate depends on the current density applied thereto. Thus, the material of interest may be completely removed in ½ to one full rotation of the substrate. At lower current densities, several rotations of the substrate around the anode may be needed. Also, only portions of the material on the substrate may be removed. In some applications the substrate may come into contact with the pad during the process operation. The combination of the electrolyte and mechanical work of the pad on the substrate may be used to modify the surface of the substrate.

Returning to the material removal or deposition process, the linear or non-linear openings in the non-porous pad allow electric field distribution only through the openings. As the substrate or the pad is slowly rotated, the openings sweep over the substrate surface to be processed. The regions or portions of the substrate directly across from the openings in the pad are therefore plated in the case of deposition, etched in the case of substrate electro-removal (etch or polish), or just oxidized and then dissolved in the electrolyte with or without the mechanical actions of the pad. The openings can have various shapes. However, for uniform material removal or deposition/surface modifications, it is important that the pad and/or the substrate be rotated, such that all portions of the substrate surface are exposed to the electric field for some period of time.

Figure 10:
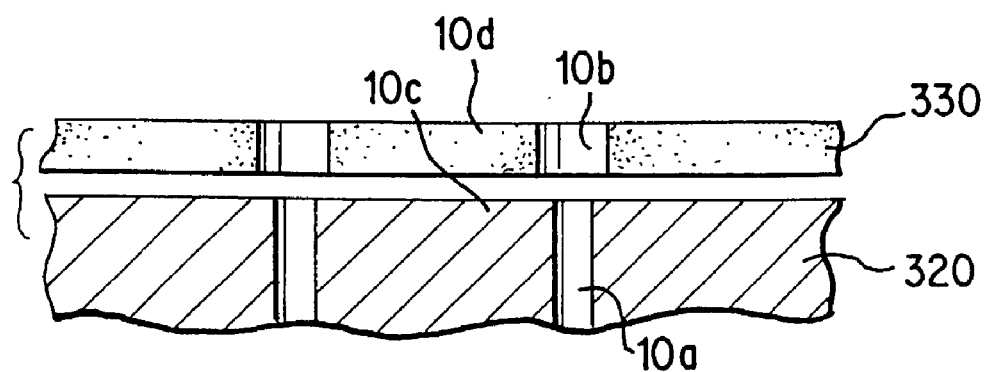
FIG. 10 is a partial cross-sectional view of a plating and polishing pad arranged over a pad support member in accordance with the present invention.

In certain preferred embodiments of the invention, the channel openings (orifices or perforations) in the pad support member 320 (anode portion) and the orifices in the pad material 330 arranged directly above can be of different dimensions. For example, FIG. 10 is a partial cross-section of the pad support member 320 and pad material 330 in which the diameter of the channel 10a in the pad support member 320 is less than the diameter of the channel lob in the pad material 330. While FIG. 10 illustrates a concentric arrangement between the channels 10a and 10b, this need not be the case. A top-plan view of the partial cross-section of FIG. 10 is shown in FIG. 11.

Figure 11:
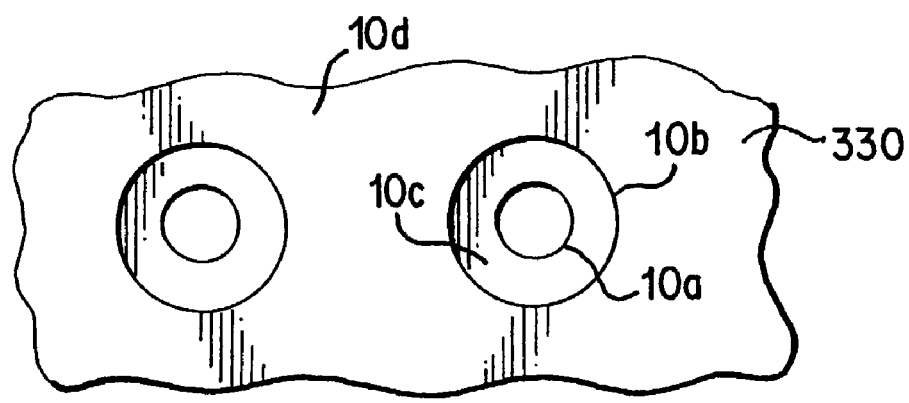
FIG. 11 is an enlarged partial top-plan view of the structure according to FIG. 10.

The surface of the pad support member 320 (anode portion) arranged between the pad support member 320 and the pad material 330 as shown in FIGS. 10 and 11 may be used to control the uniformity of the metal deposited on the substrate. For example, the diameter of the channel 10a in the pad support member 320 may range between about 0.3 to 1.5 mm, while the diameter of the channel 10b and the pad material 330 may range between about 1.7 to 7 mm. The portion 10c of the surface of the pad support member between the two channel openings 10a and 10b, are regions where the electric field and the electrolyte are exposed to the substrate. By contrast, pad material regions 10d act as an insulating shield with respect to the substrate. Depending on the shaping of the channel openings in the pad material and the pad support member, the pad material may serve as both an anode and cathode shield. This is because it is in contact with both the anode and cathode simultaneously during material processing. The shield may selectively filter the electrolyte fluid, the electric field or the magnetic field in different proportions. This selective filtration of the deposition parameters is used to control the uniformity of the deposited/removed material, as well as the mechanical, electrical and magnetic properties of the process with respect to the surface of the material or substrate. Also, the net amount of material deposited on the substrate or removed from the substrate is further enhanced by the presence of abrasive material in the pad material, especially in the surface of the pad material.

In a preferred embodiment, portions of the pad material in contact with the substrate act as insulators, however, in other embodiments ferroelectric or, magnetic materials may be incorporated or laminated within the pad material. The incorporation of a magnetic material within the pad material may be used to filter or shield magnetic field communications through the material during the deposition of a magnetic film on the workpiece.

Figure 12:
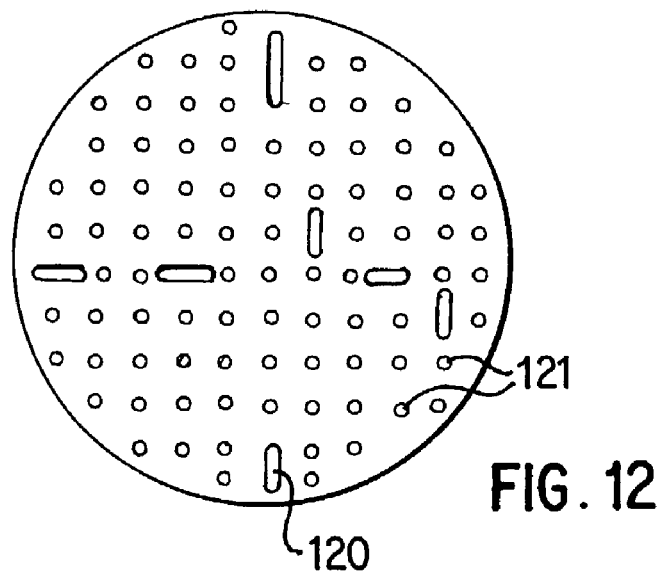
FIG. 12 is a schematic top-plan view of another embodiment of the plating and polishing pads according to the present invention.
Figure 13:
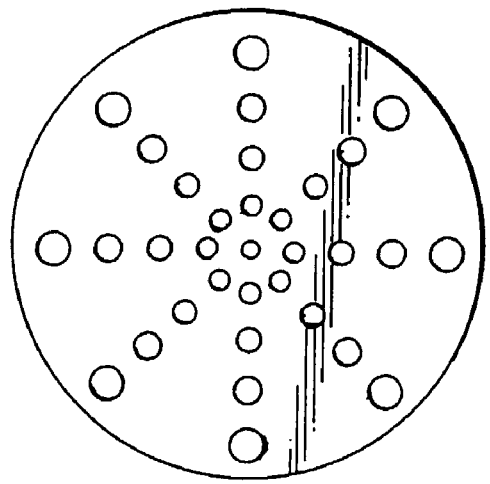
FIG. 13 is a schematic top-plan view of another embodiment of the plating and polishing pads according to the present invention.

Besides using circular or cylindrical channels or orifices in the various components, other geometries or combinations of geometries may be used. It is found particularly helpful to use slits and circular or cylindrical openings in the pad material to control local uniformity. FIG. 12, for example, is a top view of a pad in which a number of slits 120 are used near the edge of the pad material to increase the thickness of the material deposited at and/or near the edge of the substrate. The slits may be incorporated into pads with circular channels 121 designed to tune or tailor the local uniformities of the material deposits on the substrate or the removed materials from the substrate. FIG. 13 is an example in which an outwardly increasing diametrical hole size is used to increase the thickness of deposited material at and/or near the edge of the substrate.

Figure 15:
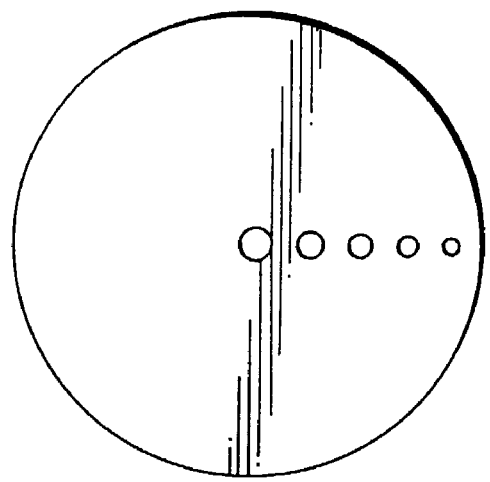
FIG. 15 is a schematic top-plan view of still yet another embodiment of the plating and polishing pads according to the present invention
Figure 14:
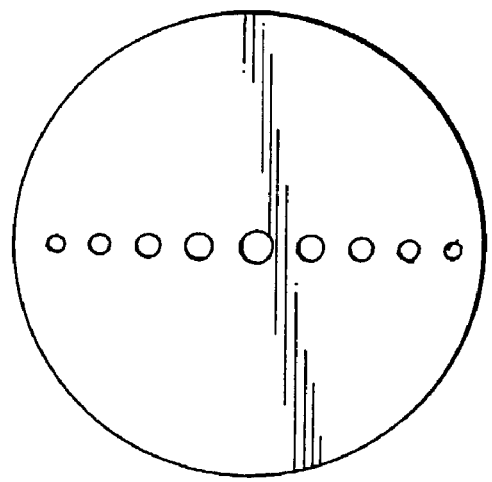
FIG. 14 is a schematic top-plan view of yet another embodiment of the plating and polishing pads according to the present invention.

In certain material removal applications, it is often preferred that the material removal process proceed from at or near the center of the workpiece and decrease outwardly towards the periphery. In this case, it is especially advantageous that the larger sized channels in the pad material be arranged at or close to the center of the pad material as shown in FIGS. 14 and 15. In this case, the smaller holes in the pad material reside close to the periphery of the pad material. Also, the diameter or size of the holes may be graded, such that the diameter decreases from the center of the pad towards the edge or periphery of the pad.

In yet another embodiment, the diameter or size of the pad material or the pad support member (or even the anode) may be smaller than the size of the substrate. For example, the diameter of the pad may be about 40% to 70% of the substrate. During material deposition, in the case when the anode and pad is preferentially arranged to one side of the chamber relative to the substrate, excessive material deposits may be observed on the portion of the substrate that continuously overlaps with the anode or pad material. This excess local deposit is a major source of deposit non-uniformity. This poor deposit uniformity is drastically reduced by shaping the pad material in such a manner that fewer and smaller holes or perforations are fabricated around the center of the pad, especially in the region of continuous overlap between the pad and the substrate. While large perforations may be fabricated away from the region of overlap and towards the periphery of the pad as shown in FIG. 13.

The above-described channel or perforation distribution selectively enhances more electrolyte and electric field communication towards the larger openings in the pad, thus increasing metal deposition to this region.

In the previous descriptions, numerous specific details are set forth, such as specific materials, structures, chemicals, processes, etc., in order to provide a thorough understanding of the present invention. However, as one having ordinary skill in the art recognizes, the present invention can be practiced without resorting to the details or specific embodiments set forth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pad structure for use in an apparatus for depositing material on, or removing material from, a substrate, the pad structure comprising:
   a substantially circular pad material having a top surface, a bottom surface and a defined thickness;
   means for communicating electrolyte and an electric field, magnetic field or electromagnetic field through the pad material to the substrate, wherein the communicating means is an array of holes extending through the pad material and arranged in a radial direction from a center of the pad material; and
   an adhesive system on the bottom surface, wherein the adhesive system is configured to block at least one of the holes to control distribution of at least one of the electric field and the electromagnetic field through the pad material.

2. The pad structure according to claim 1, wherein multiple radially arranged arrays of holes extend through the pad material, the holes of each array being staggered with respect to one another.

3. The pad structure according to claim 1, wherein the cross-sectional openings of said holes increase in size in the radial direction from a center of the pad material, whereby a thickness of deposited material on the substrate increases in a radial direction.

4. The pad structure according to claim 1, wherein larger ones of said array of holes are located near the center of the pad material and smaller ones are arranged near a periphery of the pad material.

5. The pad structure according to claim 1, wherein the adhesive system comprises adhesive material arranged about a periphery of the bottom surface, the adhesive material being arranged about the periphery by one of: a continuous strip, a plurality of strip segments, a plurality of triangular-shaped adhesive portions and a plurality of circular-shaped adhesive portions.

6. The pad structure according to claim 5, wherein the adhesive system further comprises additional adhesive material arranged inwardly of the periphery of the bottom surface.

7. The pad structure according to claim 1, wherein the adhesive system has defined characteristics to promote or inhibit electric, magnetic or electromagnetic field distributions through the pad material to the substrate.

8. The pad structure according to claim 1, wherein the adhesive system is an adhesive sheet having perforation holes arranged therein.

9. The pad structure according to claim 1, wherein the pad material is formed of:
   a top pad material and a subpad material; and
   an adhesive securing the top pad material to the subpad material.

10. The pad structure according to claim 9, wherein the communicating means comprises channels arranged in the top pad, subpad, and the adhesive.

11. The pad structure according to claim 9, wherein the subpad material is formed of a flow diffusing fabric, said top pad and adhesive having flow channels formed therein.

12. A pad structure for use in an apparatus for depositing material on, or removing material from, a substrate, the pad structure comprising:
- a pad material having a top surface, a bottom surface and a defined thickness;
- at least one opening extending between the top surface and the bottom surface, the at least one opening having an inlet at the bottom surface and an outlet at the top surface, wherein the at least one opening is adapted to communicate electrolyte and an electric field, magnetic field or electromagnetic field through the pad material to the substrate, wherein the substrate is exposed to the outlet and wherein the at least one opening is a slit extending across a substantial portion of the diameter of the pad material, said slit also extending through the pad material; and
- an adhesive system on the bottom surface, wherein the adhesive system is configured to block at least a portion of the inlet and configured to control distribution of at least one of the electric field and the electromagnetic field through the pad material.

13. The pad structure according to claim 12, wherein the at least one opening is a radially oriented slit extending through the pad material.

14. The pad structure according to claim 12, wherein the at least one opening is an arc-segmentally-shaped slit extending through the pad material.

15. The pad structure according to claim 12, wherein the at least one opening further comprises a plurality of holes extending through the pad material and a plurality of slits extending through the pad material.

16. The pad structure according to claim 15, wherein a number of said plurality of slits are located near an edge of the pad material, whereby an increased thickness of deposited material near an edge of the substrate is obtainable.

17. The pad structure according to claim 12, wherein the at least one opening includes a plurality of channels formed through the pad material, some of which interact with a pad support to allow both electrolyte and electric field flow therethrough and others of which allow only electric field flow therethrough.

18. A pad for polishing a surface of a substrate comprising:
- a plurality of channels formed therein, wherein the plurality of channels extend between a first surface and an opposite second surface of the pad, wherein at least one of the plurality of channels has an outlet exposed, wherein the surface of the substrate is exposed to the outlet, and wherein the plurality of channels are cylindrical and the channels include a diameter from 0.5 mm to 5 mm; and
- an adhesive system on one of the first and second surfaces, wherein the adhesive system is configured to block at least one of the channels to control distribution of at least one of an electric field and electromagnetic field through the pad.

19. The pad according to claim 18, wherein the channels are spaced apart from each other up to a distance of one to four times the channel diameter.

20. The pad according to claim 18, wherein the plurality of channels are adapted to flow a solution through the pad.

21. The pad according to claim 18, wherein the plurality of channels includes varied sized channels as a function of distance from a center of the pad.

22. The pad according to claim 21, wherein the plurality of channels increase in diametrical channel size with distance from the center of the pad.

23. The pad according to claim 21, wherein the plurality of channels decrease in diametrical channel size with distance from the center of the pad.

24. The pad according to claim 18 further comprising a support structure attached to an undersurface of the pad.

25. A pad for polishing a surface of a substrate comprising:
- a plurality of channels formed therein;
- a polishing surface having a plurality of grooves disposed thereon, wherein a portion of the plurality of grooves intersect the plurality of channels, wherein the plurality of channels extend between the polishing surface and a bottom surface opposite the polishing surface; and
- an adhesive system on the bottom surface, wherein the adhesive system is non-porous under at least one of the channels and to configured to control distribution of at least one of an electric field and electromagnetic field through the pad.

26. The pad according to claim 25, wherein the polishing surface includes hard abrasive particles disposed thereon.

27. A pad for polishing a surface of a substrate comprising:
- a plurality of channels formed therein;
- a polishing surface having a plurality of grooves disposed thereon, wherein the plurality of grooves extend transversely with respect to one another, wherein the plurality of channels extend between the polishing surface and a bottom surface opposite the polishing surface; and
- an adhesive system on the bottom surface, wherein the adhesive system is non-porous under at least one of the channels and to configured to control distribution of at least one of an electric field and electromagnetic field through the pad.

28. The pad according to claim 27, wherein side walls of the grooves are inclined with respect to a vertical plane.

29. The pad according to claim 27, wherein side walls of the grooves are vertical with respect to a horizontal plane.

30. A pad for polishing a surface of a substrate comprising:
- a plurality of channels formed therein, wherein the plurality of channels extend between a polishing surface and an opposite undersurface of the pad, wherein at least one of the plurality of channels has an outlet exposed, wherein the surface of the substrate is exposed to the outlet;
- an adhesive system on one of the first and second surfaces, wherein the adhesive system is configured to block at least one of the channels to control distribution of at least one of an electric field and electromagnetic field through the pad; and
- a support structure attached to the undersurface of the pad by the adhesive system, wherein the support structure includes a plurality of channels disposed therein and adapted to flow material therethrough and at least a portion of the plurality of channels in the pad are aligned with the plurality of channels in the support structure adapted for the flow of the material through the support structure and the pad.

31. The pad structure according to claim 30, further comprising a conductive sheet disposed between the pad and the support structure.

32. The pad structure according to claim 30, further comprising a plurality of grooves disposed on the polishing surface, wherein the plurality of grooves intersect one another.

33. The pad structure according to claim 30, further comprising a plurality of grooves disposed on the polishing surface, wherein a portion of the plurality of grooves intersect a portion of the plurality of channels.

34. The pad structure according to claim 30, wherein the pad is shaped varying in thickness from center to edge.

35. The pad structure according to claim 34, wherein the pad is thinner near the edge.

36. The pad structure according to claim 34, wherein the pad is thicker near the edge.

* * * * *